(12) United States Patent
Lee et al.

(10) Patent No.: US 9,277,392 B2
(45) Date of Patent: Mar. 1, 2016

(54) METHOD OF PROVIDING COMMUNICATION SERVICES FROM WIRELESS COMMUNICATION SYSTEM TO TERMINAL AND APPARATUS THEREFOR

(75) Inventors: Sung Won Lee, Seoul (KR); Han Na Lim, Seoul (KR); Beom Sik Bae, Suwon-si (KR)

(73) Assignees: Samsung Electronics Co., Ltd., Suwon (KR); Kyung Hee University Industry Academic Cooperation Foundation, Yoingin-si (KR)

( * ) Notice: Subject to any disclaimer, the term of this patent is extended or adjusted under 35 U.S.C. 154(b) by 834 days.

(21) Appl. No.: 13/387,816

(22) PCT Filed: Jul. 29, 2010

(86) PCT No.: PCT/KR2010/004977
§ 371 (c)(1),
(2), (4) Date: Feb. 15, 2012

(87) PCT Pub. No.: WO2011/014015
PCT Pub. Date: Feb. 3, 2011

(65) Prior Publication Data
US 2012/0135713 A1 May 31, 2012

(30) Foreign Application Priority Data
Jul. 31, 2009 (KR) .......................... 10-2009-0070457

(51) Int. Cl.
*H04W 24/00* (2009.01)
*H04W 8/02* (2009.01)
*H04W 84/04* (2009.01)

(52) U.S. Cl.
CPC .............. *H04W 8/02* (2013.01); *H04W 84/045* (2013.01)

(58) Field of Classification Search
CPC ..... H04W 84/045; H04W 8/02; H04W 12/06; H04W 76/02; H04W 12/04; H04Q 2213/13097; H04L 41/0806
USPC .............. 455/405, 411, 434, 435.1, 450, 561, 455/436, 445, 444, 422.1, 452.1
See application file for complete search history.

(56) References Cited

U.S. PATENT DOCUMENTS 8,041,335 B2 * 10/2011 Khetawat et al. .......... 455/404.2
8,150,317 B2 * 4/2012 Suh et al. .................... 455/41.2
(Continued)

FOREIGN PATENT DOCUMENTS

EP      2007161 A1 * 12/2008 ............ H04W 36/00
KR  10-2002-0037646 A1   5/2002
(Continued)

*Primary Examiner* — Joseph Arevalo
(74) *Attorney, Agent, or Firm* — Jefferson IP Law, LLP

(57) ABSTRACT

A method and apparatus for a micro Base Station (BS) to provide a terminal with communication service in a wireless communication system are provided. The method includes forwarding, in the micro BS, an attach request message received from the terminal to a local Mobility Management Entity (MME), determining, at the local MME, whether the terminal has performed at least one of authentication and registration processes, transmitting, at the MME, to a local registration processor a service provision check request message asking for whether the terminal is registered with the communication service to a local registration processor, and providing the terminal with the communication service in response to a service provision check acknowledge message accepting the attach request which is received from the local registration processor and no communication service in response to the service provision check acknowledge message rejecting the attach request which is received from the local registration processor.

17 Claims, 37 Drawing Sheets

(56) References Cited

U.S. PATENT DOCUMENTS

| | | | |
|---|---|---|---|
| 8,175,056 B2* | 5/2012 | Suh et al. | 370/331 |
| 8,701,178 B2* | 4/2014 | Suh et al. | 726/12 |
| 2008/0207170 A1* | 8/2008 | Khetawat et al. | 455/411 |
| 2008/0293376 A1* | 11/2008 | Suh et al. | 455/410 |
| 2008/0293433 A1* | 11/2008 | Wallis | 455/456.1 |
| 2008/0295154 A1* | 11/2008 | Suh et al. | 726/4 |
| 2008/0305792 A1* | 12/2008 | Khetawat et al. | 455/435.1 |
| 2009/0059848 A1* | 3/2009 | Khetawat et al. | 370/328 |
| 2009/0059864 A1* | 3/2009 | Suh et al. | 370/331 |
| 2009/0191844 A1* | 7/2009 | Morgan et al. | 455/411 |
| 2010/0112981 A1* | 5/2010 | Suh et al. | 455/411 |
| 2010/0227611 A1* | 9/2010 | Schmidt et al. | 455/434 |

FOREIGN PATENT DOCUMENTS

| | | |
|---|---|---|
| KR | 10-2007-0038618 A1 | 4/2007 |
| KR | 10-2007-0079541 A1 | 8/2007 |

\* cited by examiner

FIG. 10

| SourceID | PermittedServiceOption | PermittedServiceAllowed | PermittedServicePeriod |
|---|---|---|---|
| IMEI_1 | [0] data only | 2009.07.10_18:13:25 | 60 minute |
| IMEI_2 | [1] data + circuit voice | 2009.07.10_12:24:20 | 60 minute |

...

| IMEI_n | [0] data only | 2009.07.10_17:08:05 | 360 minute |

FIG. 19

| Result field | Length(Oct) | Result value |
|---|---|---|
| Result | 1 | processing result (e.g. success [0], fail [1]) |
| Reason | 1 | code wilch explain the reason for the returned result |
| DeviceID | 2 | IMEI/MEID of source unauthenticated machine |
| PermittedServiceOption | 1 | data only [0], data + circuit voice [1], data + IMS voice [2], others are reserved |
| PermittedServiceAllowed | VAR | duplication permission time (e.g. GPS) |
| PermittedServicePeriod | 2 | temporal service in minutes, permanent [0] |

FIG. 35

| Record field | Number(oct) | Record value |
|---|---|---|
| Result | 1 | processing result (e.g. success [0], fail [1]) |
| Reason | 1 | code which explain the reason for the returned result |
| DeviceID | 2 | IMEI/MEID of source unauthenticated machine |
| PermittedServiceOption | 1 | data only [0], data + circuit voice [1], data + IMS voice [2], others are reserved |
| PermittedServiceAllowed | VAR | authication permission time (e.g. GPSI) |
| PermittedServicePeriod | 2 | temporal service in minutes, permanent [0] |

METHOD OF PROVIDING COMMUNICATION SERVICES FROM WIRELESS COMMUNICATION SYSTEM TO TERMINAL AND APPARATUS THEREFOR

BACKGROUND OF THE INVENTION

1. Field of the Invention

The present invention relates to a wireless communication system and, in particular, to a method and apparatus for providing unauthenticated/unregistered devices with communication service via a micro base station apparatus having whole or some of signal and data termination function running at the core network.

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2(3GPP2), and 802.16 defined in IEEE, have been developed to support the high-speed, high-quality wireless packet data communication services.

Meanwhile, a Subscriber Identity Module (SIM) has been developed for the subscriber to receive mobile communication service freely with a phone number in any area supporting different mobile communication technologies such as Code Division Multiple Access (CDMA) and Global System for Mobile Communication (GSM). The SIM designed for GSM has been replaced by Universal Subscriber Identification Module (USIM) which is designed to support various supplementary services as well as voice communication function as the mobile communication system has evolved to Wideband-CDMA (WCDMA).

In order for a user to use a communication service with a device, it is necessary to insert an authentication device, such as SIM, into the device, and most of the current devices are designed not supporting wireless communication without SIM.

There is therefore a need of research to allow an unauthenticated/unregistered device, particularly having no attached authentication device such as SIM.

DISCLOSURE OF INVENTION

Technical Problem

The present invention has been made in an effort to solve the above problem and it is an object of the present invention to provide a method and apparatus that is capable of providing an unauthenticated/unregistered device, as well as authenticated/registered devices, with communication services.

In order to achieve this object, the present invention proposes a micro base station responsible for whole or some of the signal and data termination functions of the core network and defines a procedure for providing the unauthenticated/unregistered device with the communication service via the micro base station.

Solution to Problem

In accordance with an aspect of the present invention, a method for a micro base station to provide a terminal with communication service in a wireless communication system includes forwarding, in the micro base station, an attach request message received from the terminal to a local mobility management entity; determining, at the local mobility management entity, whether the terminal has performed at least one of authentication and registration processes; transmitting, at the mobility management entity, to a local registration processor a service provision check request message asking for whether the terminal is registered with the communication service to a local registration processor; and providing the terminal with the communication service in response to a service provision check acknowledge message accepting the attach request which is received from the local registration processor and no communication service in response to the service provision check acknowledge message rejecting the attach request which is received from the local registration processor.

In accordance with another aspect of the present invention, an apparatus for providing a terminal with communication service in a wireless communication system includes a home base station processor which receives an attach request message transmitted by the terminal; a local mobility management entity which determines whether the terminal has performed at least one of authentication and registration processes, asks for whether to permit service provision to the terminal, provides the terminal with the service in response to a reply accepting the attach request and rejects service provision in response to a reply rejecting the attach request; and a local registration processor which generates and outputs, when a service provision check request is received from the local mobility management entity, a service provision check acknowledge accepting or rejecting the attach request according to whether the service is to be provided to the terminal

Advantageous Effects

According to the present invention, an unauthenticated/unregistered UE can use wireless broadband communication service via an HeNB equipped with all or some of the signal and data termination functions running in the core network as if the authenticated/registered UE can.

BRIEF DESCRIPTION OF THE DRAWINGS

FIG. 10 is a diagram illustrating a configuration of the whitelist maintained and managed by the iHeNB 400 of the present invention.

FIG. 19 is a diagram illustrating a format of the response message for the unauthenticated/unregistered UE 1200.

FIG. 35 is a diagram illustrating a format of response message for the unauthenticated/unregistered UE 1200.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the present invention, the unauthenticated/unregistered device can be the device which is unauthenticated or unregistered or the device which is unauthenticated and unregistered. That is, the unauthenticated/unregistered device means the unauthenticated and/or unregistered device.

A description is made of the first and second embodiments of the method for providing an unauthenticated/unregistered device with the communication service herein.

The first embodiment proposes a distributed micro base station supporting entire functions of conventional core network entities including MME, SGW, and PGW, and the distributed micro base station terminates all signal protocols and data directly without involvement of MME, SGW, and PGW of the conventional core network. Meanwhile, the second embodiment proposes a hybrid micro base station supporting the whole functions of SGW and PGW and some functions of MME, and the hybrid micro base station terminates whole data protocols and some signal protocols.

Although the description is directed to the case where whole or some of functions of the core network entities such as SGW, PDW, and MME are implemented in a micro base station, the present invention is not limited thereto, i.e. the functional entities of the conventional core network can be implemented with the supplementary functions described in the present invention.

Figure 1:
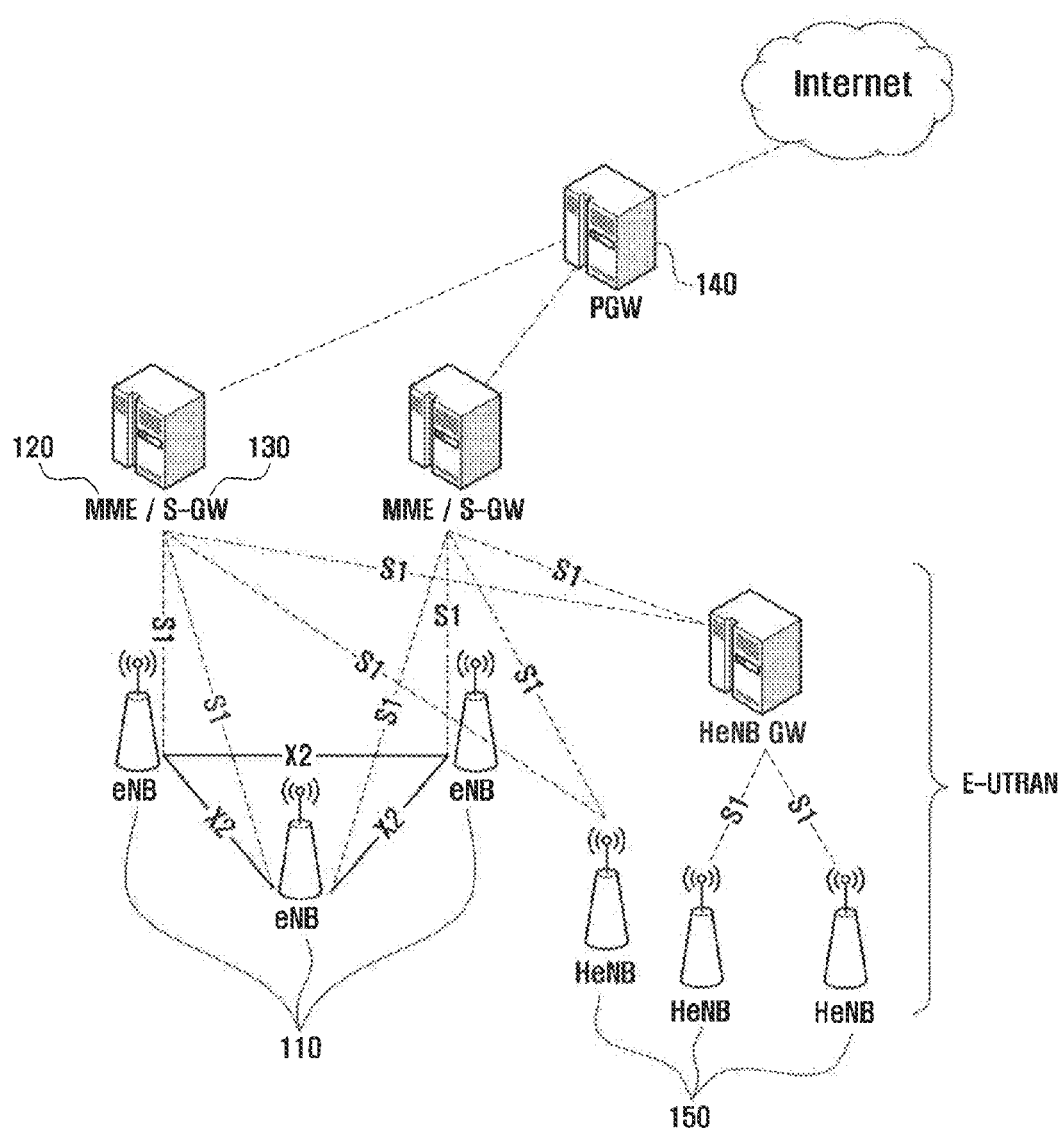
FIG. 1 is diagram illustrating a network configuration of the $3^{rd}$ Generation Partnership Project Long-Term Evolution (3GPP LTE) network.

FIG. 1 is diagram illustrating a network configuration of the 3$^{rd}$ Generation Partnership Project Long-Term Evolution (3GPP LTE) network.

Although the description is directed to the 3GPP LTE technology for simplicity purpose, the present invention is not limited thereto but can be applied to other 2$^{nd}$, 3$^{th}$, and 4$^{th}$ generation mobile communication technologies.

As shown in FIG. 1, the current broadband radio communication network is designed centered around outdoor macro base station network. That is, when the base station such as evolved Node-B (eNB) 110 exists, the network entities such as Mobility Management Entity (MME) 120 for controlling and managing eNBs, Serving Gateway (SGW) 130, and Packet Data Network Gateway (PGN) 140 are placed at the center of the carrier network.

Recently, a micro base station referred to as Home evolved Node-B (HeNB) 150 is proposed as a home/business base station device, and the HeNB 150 is connected to a core network entity for the conventional macro network to perform radio communication. The HeNB 150 is responsible for the same functions as the conventional macro eNB 110 and controlled, managed, and served by the core network.

Although not depicted in the drawing, the subscriber authentication/registration server such as Authentication, Accounting, and Administration (AAA) server communicates only with the core network device such as MME. Accordingly, only the operator can access the authentication/registration server to control and manage information.

Although an HeNB 150 is installed at a certain place, the subscriber is not allowed to authenticate/register the HeNB 150 freely. Accordingly, as the apparatus and devices interfacing the home/business broadband radio communication network are widespread in the future, the subscriber has to contact the operator more frequently to authenticate/register the individual devices which may cause the increase of the control and management cost on the home/business network devices and apparatuses.

The present invention has been conceived to solve this problem and it is an object of the present invention to provide a method for providing unauthenticated/unregistered devices with communication service.

Figure 2:
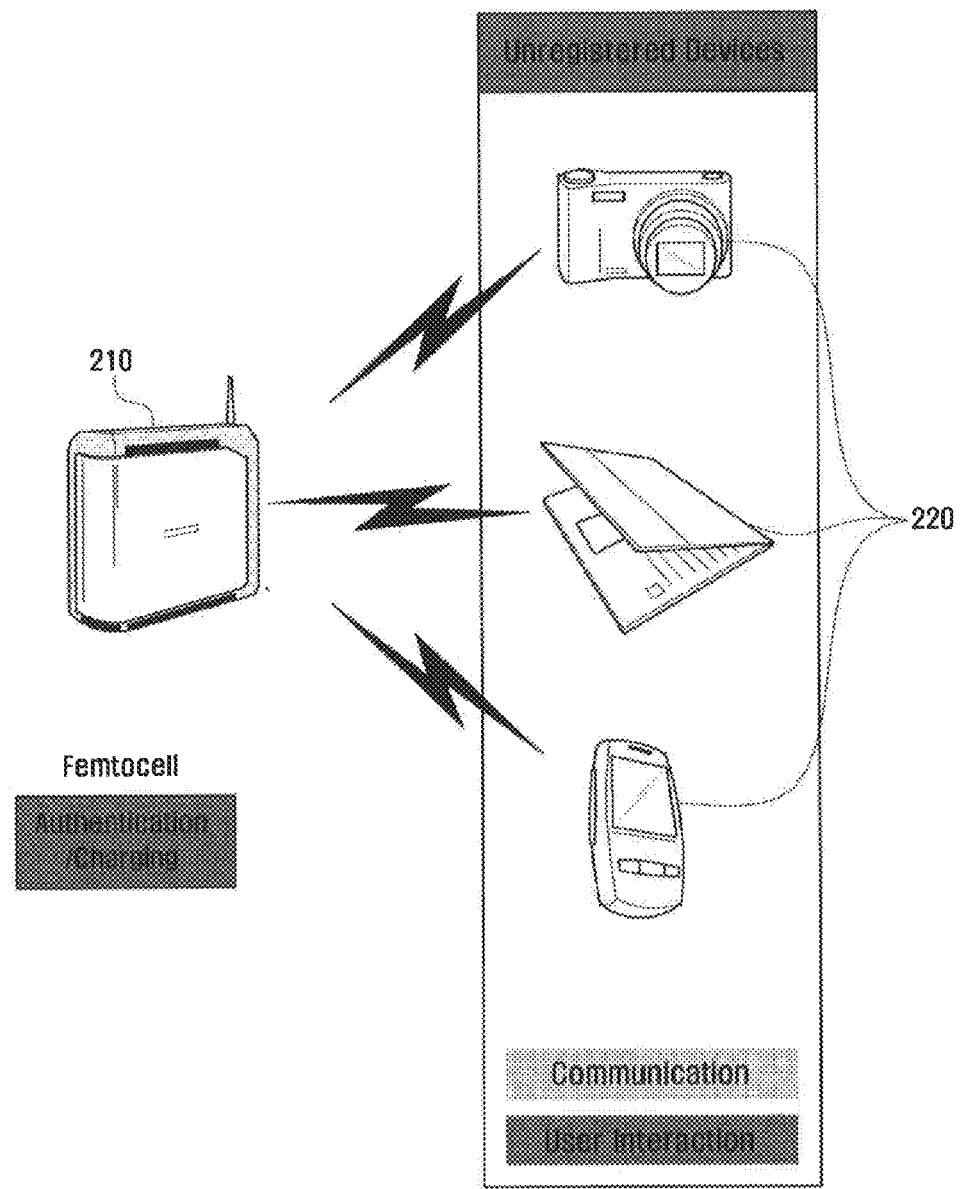
FIG. 2 is a diagram illustrating a concept for providing unauthenticated/unregistered device with communication service via a HeNB.

FIG. 2 is a diagram illustrating a concept for providing unauthenticated/unregistered device with communication service via a HeNB.

It is assumed that the devices 220 depicted in FIG. 2 are unauthenticated/unregistered devices that are purchased but not registered so as not to perform authentication and registration procedure. Particularly according to an embodiment of the present invention, it is possible to provide the devices 220 having no separate subscriber identity module such as Universal Subscriber Identification Module/Universal Integrated Circuit Card (USIM/UICC) with communication services.

In an embodiment of the present invention, the description is directed to the case using HeNB 210 such as femtocell as the functional entity providing the unauthenticated/unregistered device 220 with communication service. The HeNB 210 of the present invention works as an agent to be authenticated and billed instead of the unauthenticated/unregistered device 200.

It is just an exemplary embodiment for the HeNB 210 to provide the device with communication service, and the functions of the HeNB can be carried out by a corresponding functional entity in a macro network.

<First Embodiment>

In the following description, a distributed HeNB 310 having the whole functions of the MME, SGW, and PGW as conventional core network entities provides the unauthenticated/unregistered device with communication service according to the first embodiment of the present invention.

Figure 3:
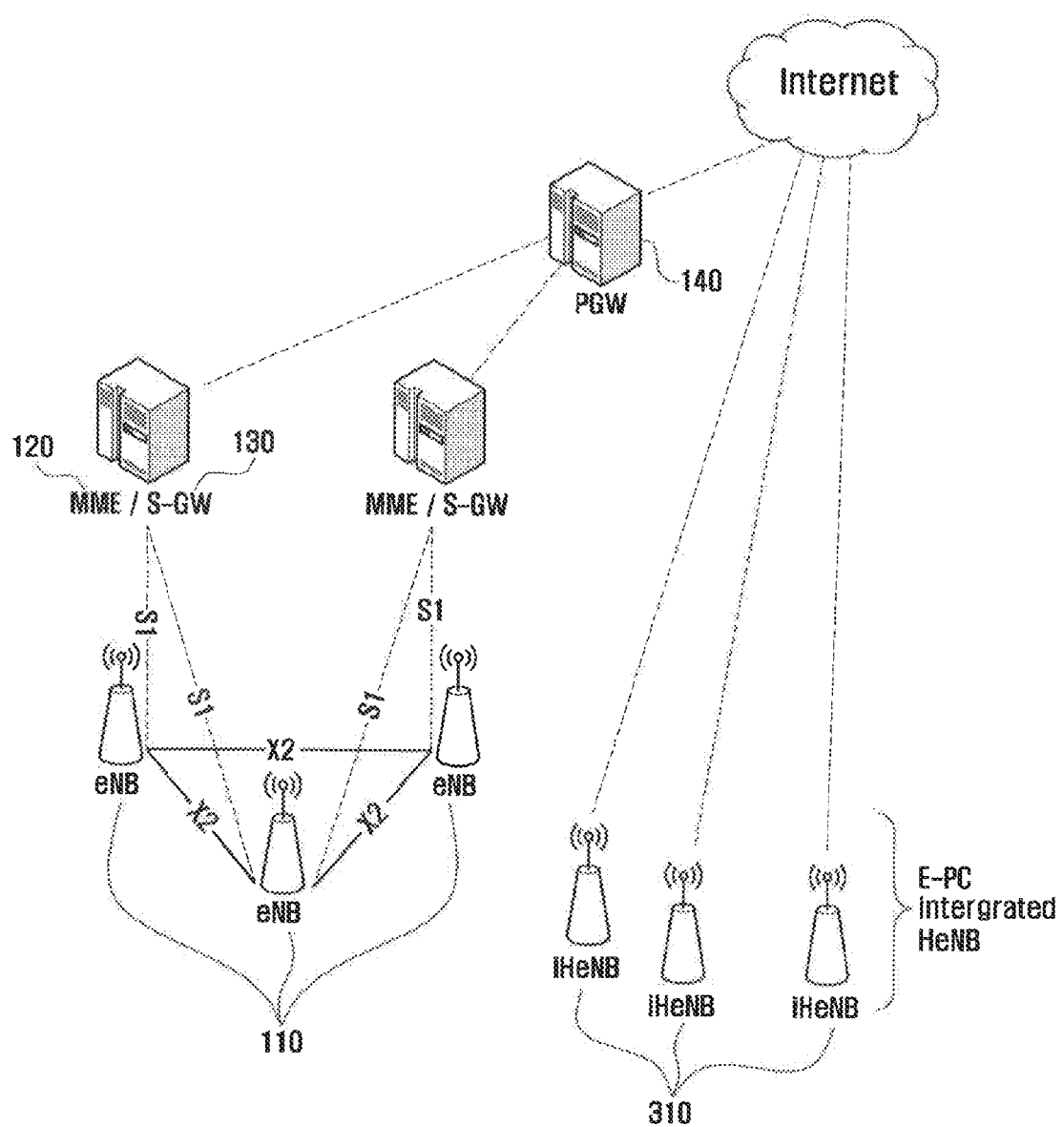
FIG. 3 is a conceptual diagram illustrating the concept for a distributed HeNB to provide an unauthenticated/unregistered device 220 with communication service.

FIG. 3 is a conceptual diagram illustrating the concept for a distributed HeNB to provide an unauthenticated/unregistered device 220 with communication service.

The distributed HeNB 310 of the present invention includes the whole functions of MME, SGW, and PGW of the core network and can connect to a data network such as Internet directly. In the present invention, the distributed HeNB 310 is also referred to as integrated Home evolved Node-B (iHeNB).

The iHeNB 310 is characterized by terminating all the signal protocols and data directly without involvement of MME 120, SGW 130, and PGW 140 of the core network.

Figure 4:
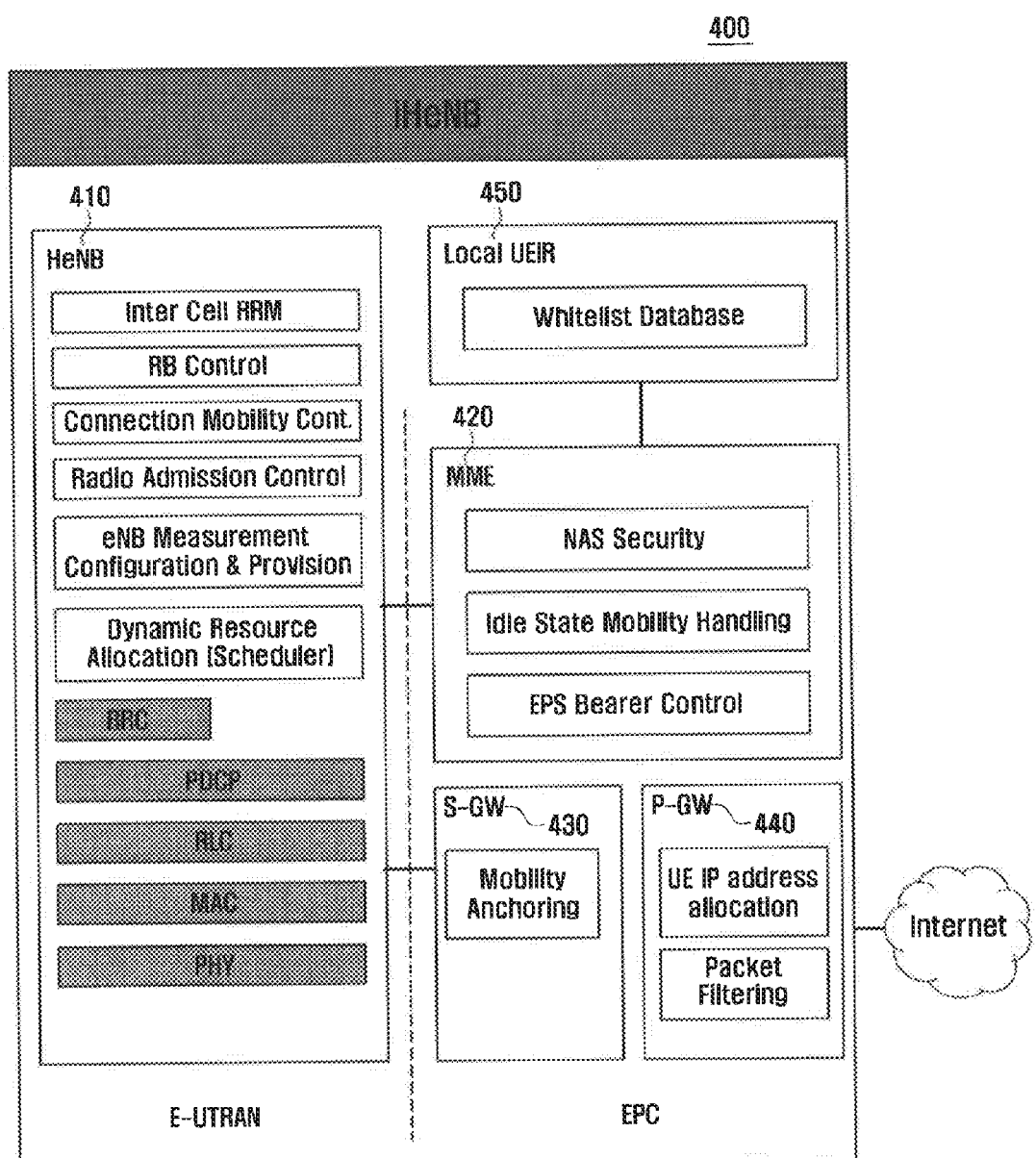
FIG. 4 is a block diagram illustrating a network function distribution of the iHeNB of the present invention.

FIG. 4 is a block diagram illustrating a network function distribution of the iHeNB of the present invention. The iHeNB 400 is provided with a Local unauthenticated/User Equipment Identity Register (L-UEIR) 450 responsible for authentication and registration information of the subscriber and User Equipment (UE) as well as the functions of MME 420, SGW 430, and PWG 440 as core network functions as compared to the conventional HeNB supporting simple base station functions. Accordingly, there is no need of a separate network device for supporting the corresponding iHeNB 400 for signal and data protocols in the operator's core network.

Here, HeNB 410 (hereinafter, the term 'HeNB processor' is used interchangeably) is the function block providing the unauthenticated/unregistered UEs 220 with mobile communication service. In order to achieve this purpose, the HeNB of the present invention supports all the functions of the conventional HeNB such as Inter Cell RRM, RB Control, Connection Mobility Cont, Radio Admission Control, eNB Management Configuration & Provision, and Dynamic Resource Allocation defined in the legacy standard. If an attach request is received from a certain UE, the HeNB 410 according to an embodiment of the present invention forwards the attach request to the MME 420 to check the authentication and registration information on the UE which has transmitted the attach request and controls Radio Resource Control Connection setup process.

The local Mobility Management Entity (MME) 420 is the function block which manages the UEs in idle mode and selects SGW 430 and PDN 440. The local MME 420 is responsible for roaming and authentication functions. The local MME 420 also processes bearer signals generated by the UE.

The Serving Gateway (SGW) 430 is the function block acting as a mobility anchor in handover between eNBs or roaming between 3GPP radio networks.

The Packet Data Network Gateway (PGW) 440 is the function block which assigns IP address to the UE, performs packet data processing function of the core network, and act as a mobility anchor in roaming between 3GPP radio network and non-3GPP radio network. The PGW 440 also determines bearer bandwidth provided to the subscriber and is responsible for packet forwarding and routing functions.

The local Unauthenticated/User Equipment Identity Register (UEIR) 450 is the function block for managing/controlling UEs and subscribers independently in the home/business broadband wireless network. If a service provision confirm request is received from the local MME 420, the local UEIR 450 generates an acceptance or rejection response to the UE depending on whether to provide the service. For this purpose, when the service provision confirm request is received, the local UEIR 450 generates a response message for accepting or rejecting the service provision according to whether the UE is registered with the whitelist for service provision. According to a preferred embodiment of the present invention, when the service for the UE registered with the whitelist starts and the allowed service time remains, the local UEIR 450 generates the response message permitting service provision to the UE.

Meanwhile, although the iHeNB 400 provides the unauthenticated/unregistered UE with communication service, it may be necessary to control and manage the iHeNB 400. A description is made of the network interface for this hereinafter with reference to FIG. 5.

Figure 5:
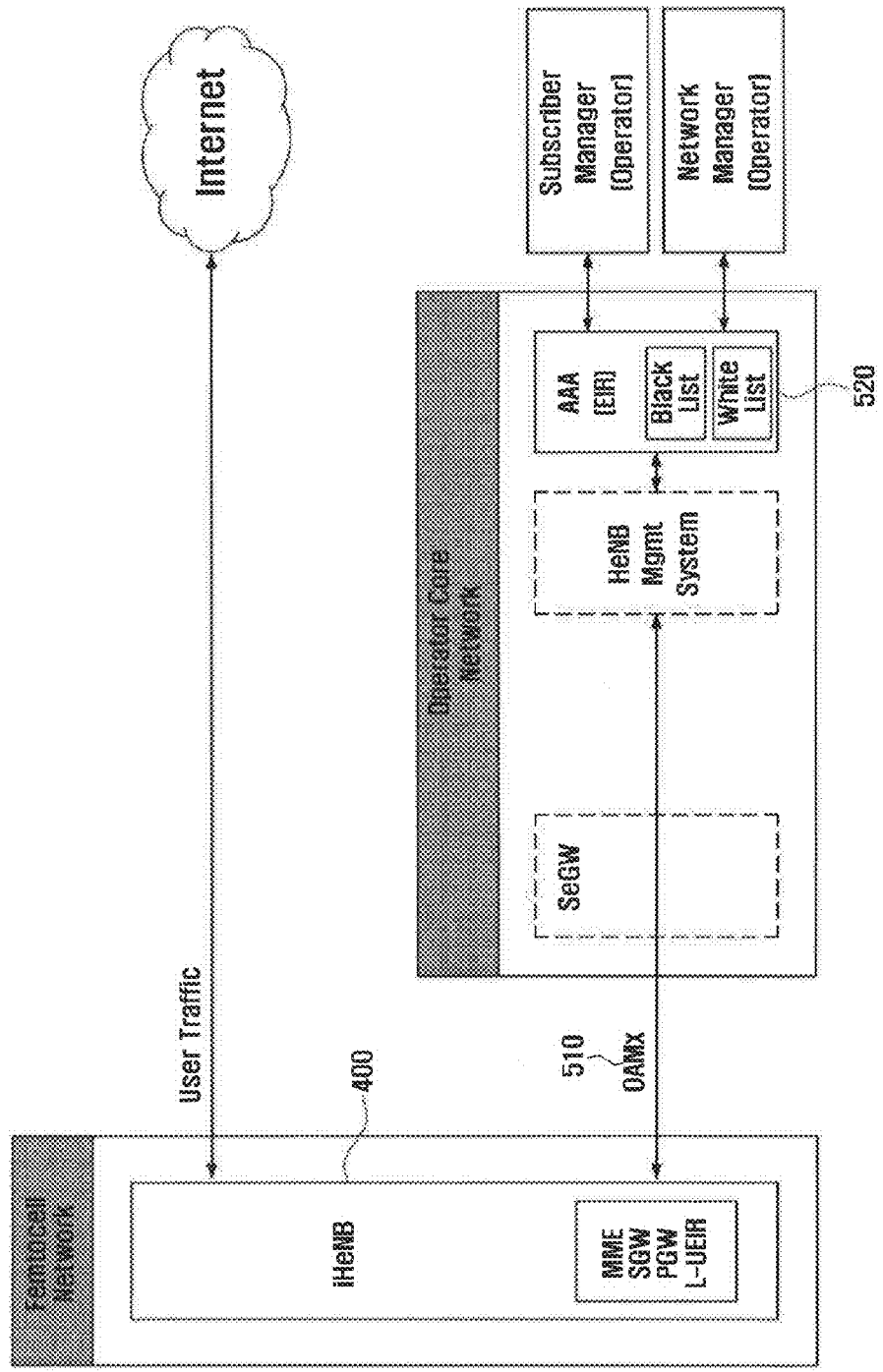
FIG. 5 is a block diagram illustrating a network interface in the radio communication network including the iHeNB 400.

FIG. 5 is a block diagram illustrating a network interface in the radio communication network including the iHeNB 400.

As shown in FIG. 5, all of the terminations of signal and data protocols are integrated into the iHeNB 400. The OAM interface for managing the iHeNB 400 has a connection to the operator's core network manager, and the present invention further defines an OAMx interface 510. Here, the OAMx interface 510 is defined as the interface for monitoring, controlling, and managing the UEs and devices authenticated/registered with the iHeNB 400 freely by the subscriber. That is, the operator communicates with the local UEIR 450 included in the iHeNB 400 via AAA/EIR as a subscriber authentication/registration server device of the core network. Accordingly, the operator can monitor the information on the UE permitted or blocked through the authentication/registration server of the core network. The operator also can forward specific information, if necessary, to the local UEIR 450 of the iHeNB 400 via the authentication/registration server.

Figure 6:
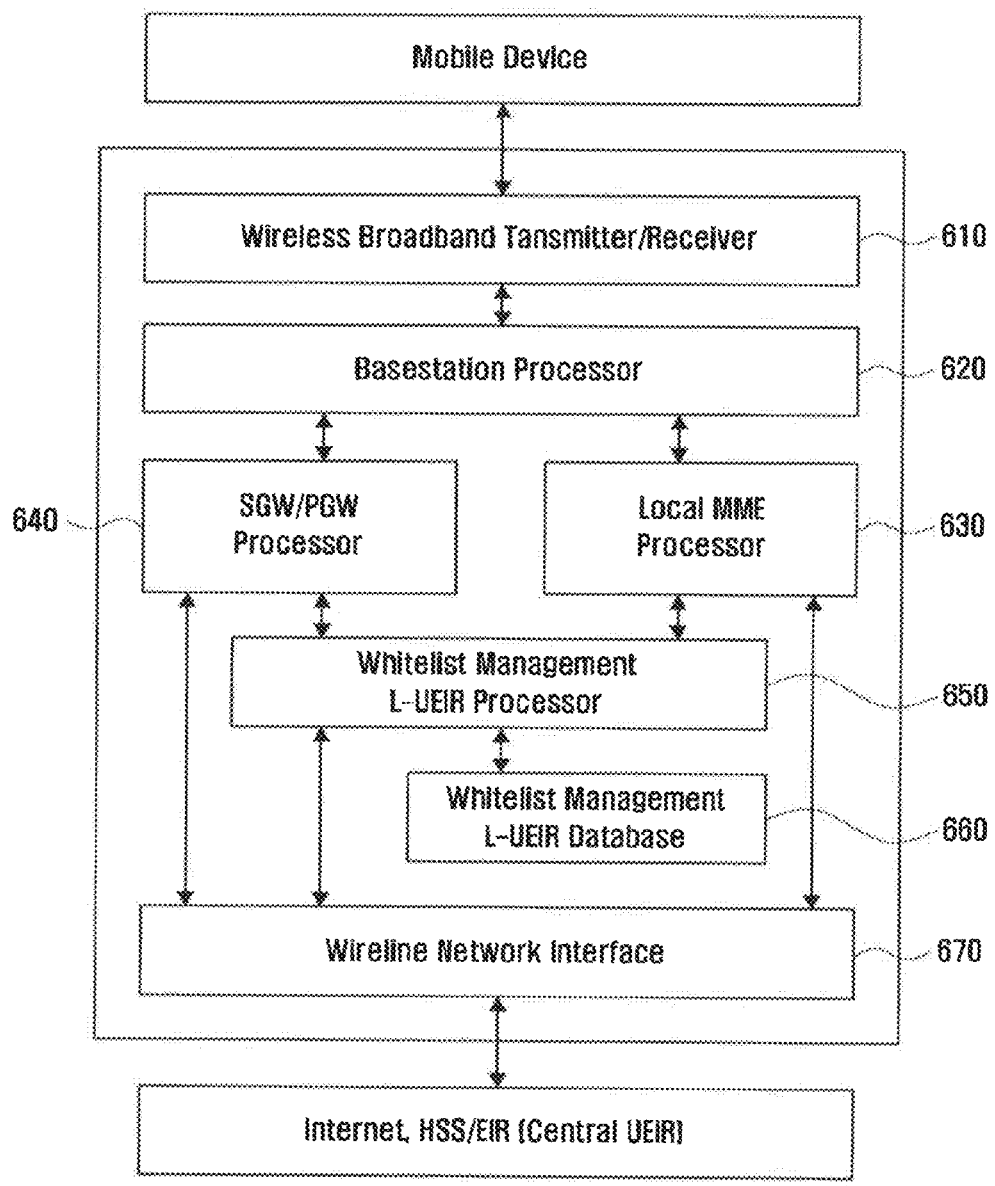
FIG. 6 is a block diagram illustrating a configuration of the iHeNB 400 of the present invention.

FIG. 6 is a block diagram illustrating a configuration of the iHeNB 400 of the present invention. As shown in FIG. 6, the iHeNB 400 of the present invention includes a Wireless Broadband Transmitter/Receiver 610, a Base Station Processor 620, a Local MME processor 630, a SGW/PGW processor 640, a local Whitelist Management L-UEIR Processor 650, a local Whitelist Management L-UEIR Database 660, and a Wireline Network Interface 670. The individual processors depicted in FIG. 6 perform the functions of the corresponding function blocks of the iHeNB 400 depicted in FIG. 4 and are described hereinafter in detail.

Here, the Wireless Broadband Transmitter/Receiver 610 receives signal or data transmitted on the radio frequency band and transmits signal and data generated in the iHeNB 400 to a data network such as the core network or Internet.

The Base Station Processor 620 manages and controls the process for providing the unauthenticated/unregistered UE 220 with communication service.

The local MME processor 630 terminates the signal protocol of home/business network or processes home/business network-specific services selectively. Particularly, when an attach request is received, the local MME processor 630 according to an embodiment of the present invention generates a ME Identity Check Request with the UE identifier (e.g. IMEI or IMSI) or service option included in the attach request message. The ME Identity Check Request message is the message to request for informing of whether the identifier of the UE transmitted the attach request is contained in the white list. The local MME processor 630 accepts or rejects the communication service to the UE which has requested for connection based on the reply in response to the ME Identity Check Request message.

The SGW/PGW processor 640 processes the termination of data protocol such as SGW/PGW protocol. In detail, the SGW/PGW processor 640 works as a mobility anchor for processing SGW protocol in handover between eNBs or roaming between 3GPP radio networks. The SGW/PGW processor 640 assigns an IP address to the UE for processing the PGW protocol, performs packet data-related functions, and works as mobility anchor between 3GPP radio network and non-3GPP radio network.

The Whitelist Management L-UEIR Processor 650 manages/controls the UEs and subscribers in the home/business wireless broadband network. Particularly, the Whitelist Management L-UEIR Processor 650 communicates with the central Whitelist Management L-UEIR process of the core network to maintain and manage the information on the unauthenticated/unregistered UEs to be accepted or rejected by the iHeNB 400. In the method proposed in the present invention, the iHeNB 400 to support the communications of all of the unauthenticated/unregistered UEs but the unauthenticated/unregistered UEs requested by the user via the central Whitelist Management L-UEIR processor and the local Whitelist Management L-UEIR processor 650. For this purpose, the local Whitelist Management L-UEIR processor 650 receives a ME Identity Check Request message requesting for the information on whether a specific UE identifier is included in the whitelist from the local MME processor 630. The local whitelist management L-UEIR processor determines whether the whitelist stored in the local Whitelist Management L-UEIR Database includes the received UE identifier and transmits the determination result to the local MME processor 630.

The local Whitelist Management L-UEIR Database 660 stores the information on the unauthenticated/unregistered UEs to be accepted or rejected by the iHeNB 400 in the whitelist under the control of the local Whitelist Management L-UEIR Processor 650.

The Wireline Network Interface 670 provides an interface for the iHeNB 400 to connect to the central Wireless Management L-UEIR processor through a wire line.

Meanwhile, the method for configuring an HeNB to accept/reject which UEs through communication with the central Whitelist Management L-UEIR processor and the local Whitelist Management L-UEIR processor can be implemented diversely according to other embodiments. In the present invention proposes an appropriate HeNB procedure for determining whether to accommodate a certain unauthenticated/unregistered UE and subscriber, a description is made of the method for providing the unauthenticated/unregistered UE with communication service through an HeNB request.

Figure 7:
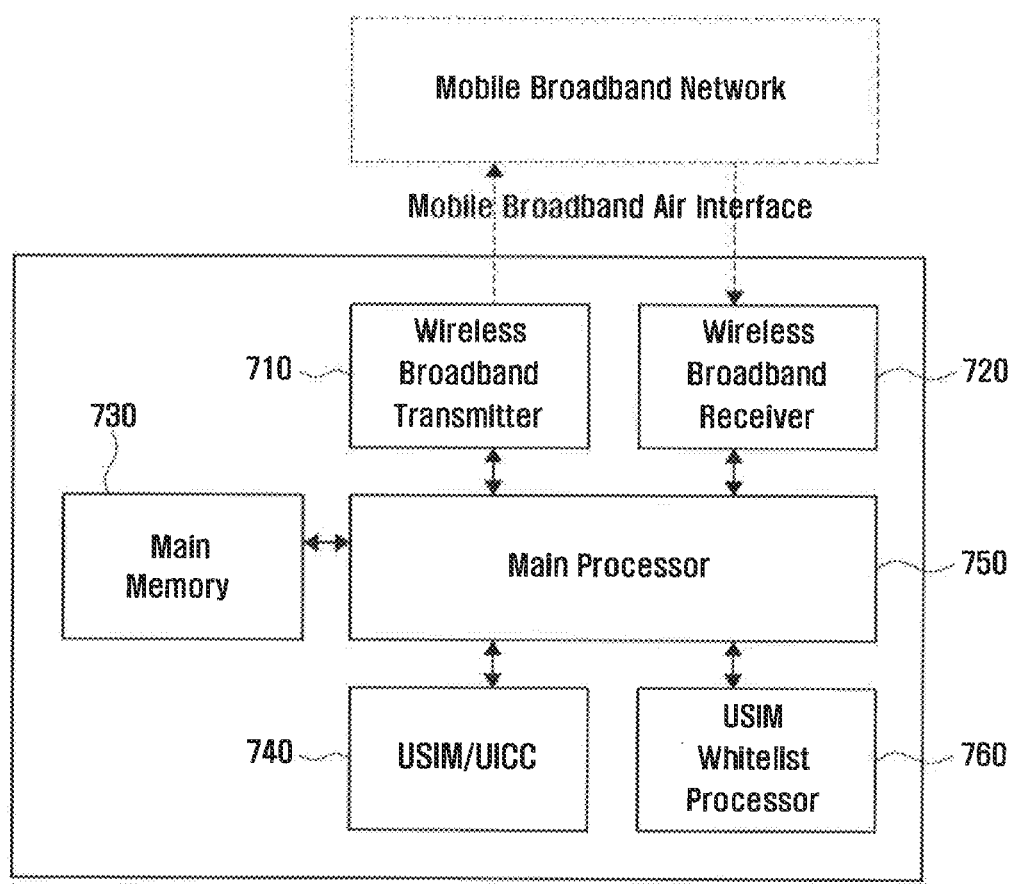
FIG. 7 is a block diagram illustrating a configuration of the UE supporting whitelist control and management according to an embodiment of the present invention.

FIG. 7 is a block diagram illustrating a configuration of the UE supporting whitelist control and management according to an embodiment of the present invention.

In the present invention, the UE supporting whitelist control and management is the UE which has completed authentication and registration procedure with a core network operator already so as to be receiving the typical mobile communication service. In the following descriptions, the terminal can be referred to as authenticated/registered UE.

As shown in FIG. 7, the authenticated/registered UE can include a wireless broadband transmitter 710, a wireless broadband receiver 720, a memory 730, a subscriber identity module 740, a controller 750, and a whitelist processor 760.

The wireless broadband transmitter 710 and the wireless broadband receiver 720 receive the signal or data transmitted on a wireless frequency band and transmits the signal or data generated in the UE to a data network such as core network or Internet.

The memory 730 stores programs and data related to the operations of the UE according to an embodiment of the present invention. The memory can include ROM, non-volatile memory (flash memory or EEPROM), and RAM.

The subscriber identity module 740 is the function block for storing private information related to subscriber authentication, billing, and security function.

The controller 750 controls and manages the overall operations of the authenticated/registered UE.

The whitelist processor 760 is responsible for the process of registering unauthenticated/unregistered UE to be accommodated via the iHeNB 400 with the whitelist. As aforementioned, there can be various embodiments of the method for configuring a certain HeNB to determine whether to accommodate/reject a certain unauthenticated/unregistered UE through communication with the central whitelist management L-UEIR processor and local whitelist management L-UEIR processor 650.

Figure 8:
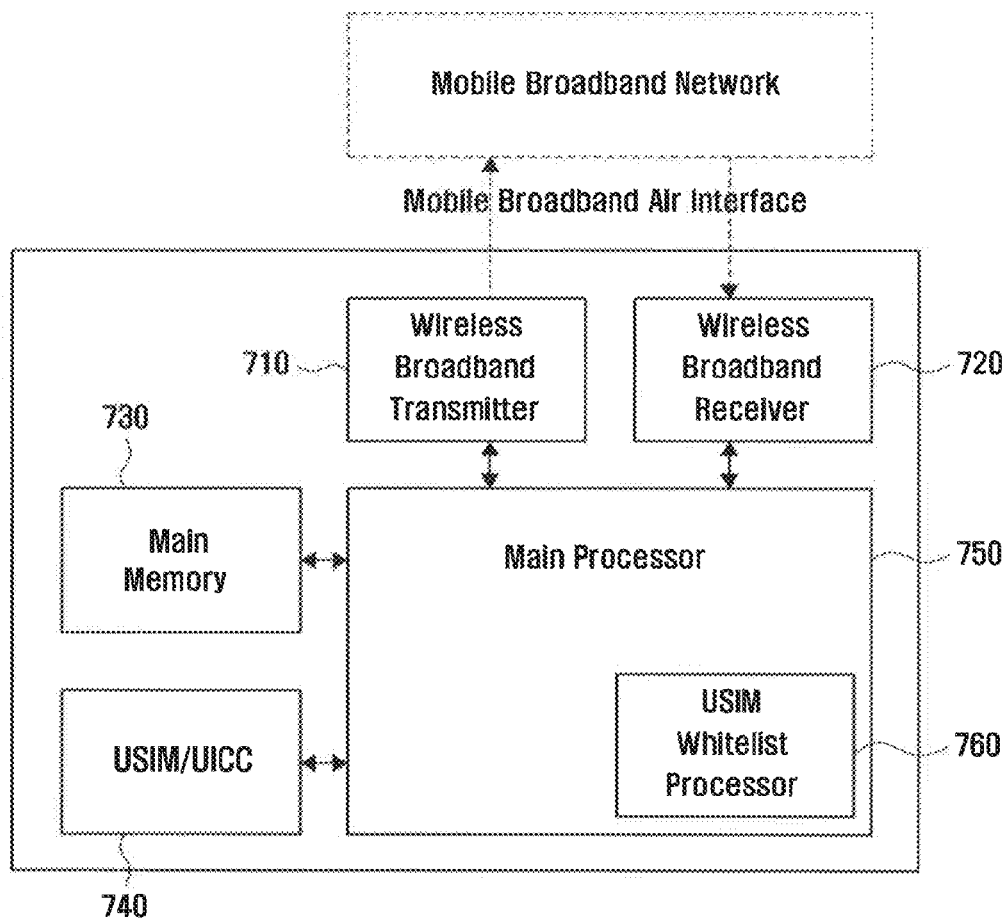
FIG. 8 is a block diagram illustrating another configuration of the authenticated/registered UE according to an embodiment of the present invention.

FIG. 8 is a block diagram illustrating another configuration of the authenticated/registered UE according to an embodiment of the present invention.

The configuration of the authenticated/registered UE depicted in FIG. 8 is similar to that of the authenticated/registered UE depicted in FIG. 7. However, the authenticated/registered UE depicted in FIG. 7 is implemented with implement processors in separation from the controller (main processor) while the authenticated/registered UE depicted in FIG. 8 is implemented with the main processor integrating the functions of the whitelist processor 760.

Figure 9:
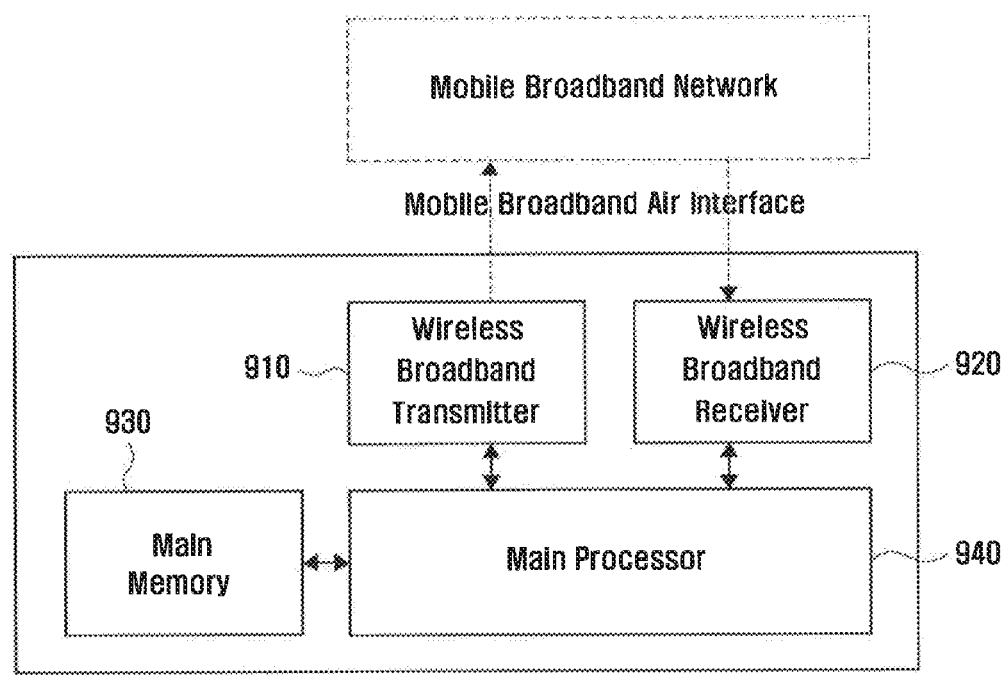
FIG. 9 is a block diagram illustrating a configuration of an unauthenticated/unregistered UE according to an embodiment of the present invention.

FIG. 9 is a block diagram illustrating a configuration of an unauthenticated/unregistered UE according to an embodiment of the present invention. As shown in FIG. 9, the unauthenticated/unregistered UE of the present invention includes a wireless broadband transmitter 910, a wireless broadband receiver 920, a memory 930, and a controller 940.

The wireless broadband transmitter 910 and wireless broadband receiver 920 receives signals and data on a radio frequency band and transmits the signal or data generated in the UE to a data network such as core network or Internet.

The memory 930 stores the programs and data necessary for the operations of the UE according to an embodiment of the present invention. The memory can include ROM, non-volatile memory (flash memory or EEPROM), and RAM.

The controller 940 controls the process for the unauthenticated/unregistered UE to receive communication service. For this purpose, the controller 940 can control such that the UE to transmit an attach request to a certain iHeNB 400 from which the communication is provided. In case that the UE is registered with the whitelist of the iHeNB 40 to which the message is transmitted, the controller 940 establishes a RRC connection with the iHeNB 400 and controls the process for setting up the bearer for data communication.

The difference between the unauthenticated/unregistered UE and authenticated/registered UE is that the unauthenticated/unregistered UE has no subscriber identity module such as USIM/UICC containing authentication information.

FIG. 10 is a diagram illustrating a configuration of the whitelist maintained and managed by the iHeNB 400 of the present invention.

As shown in FIG. 10, the whitelist of the present invention includes source IDs for identifying the devices which are unauthenticated/unregistered but allowed to receive the service. Although FIG. 10 is directed to the case of using International Mobile Equipment Identifier (IMEI) as device identifier of 3GPP for convenience of explanation, the present invention is not limited thereto.

The whitelist can include information fields such as Permitted Service Option, Permitted Service Start time, and Permitted Service Period in association with the corresponding UE. Also, it is possible to define supplementary other fields.

As described above, the whitelist is generated through communications among the central whitelist management L-UEIR processor, local whitelist management L-UEIR processor, and authenticated/registered UE and used as the information for the iHeNB 400 to determine whether to permit or reject a certain unauthenticated/unregistered UE.

Figure 11:
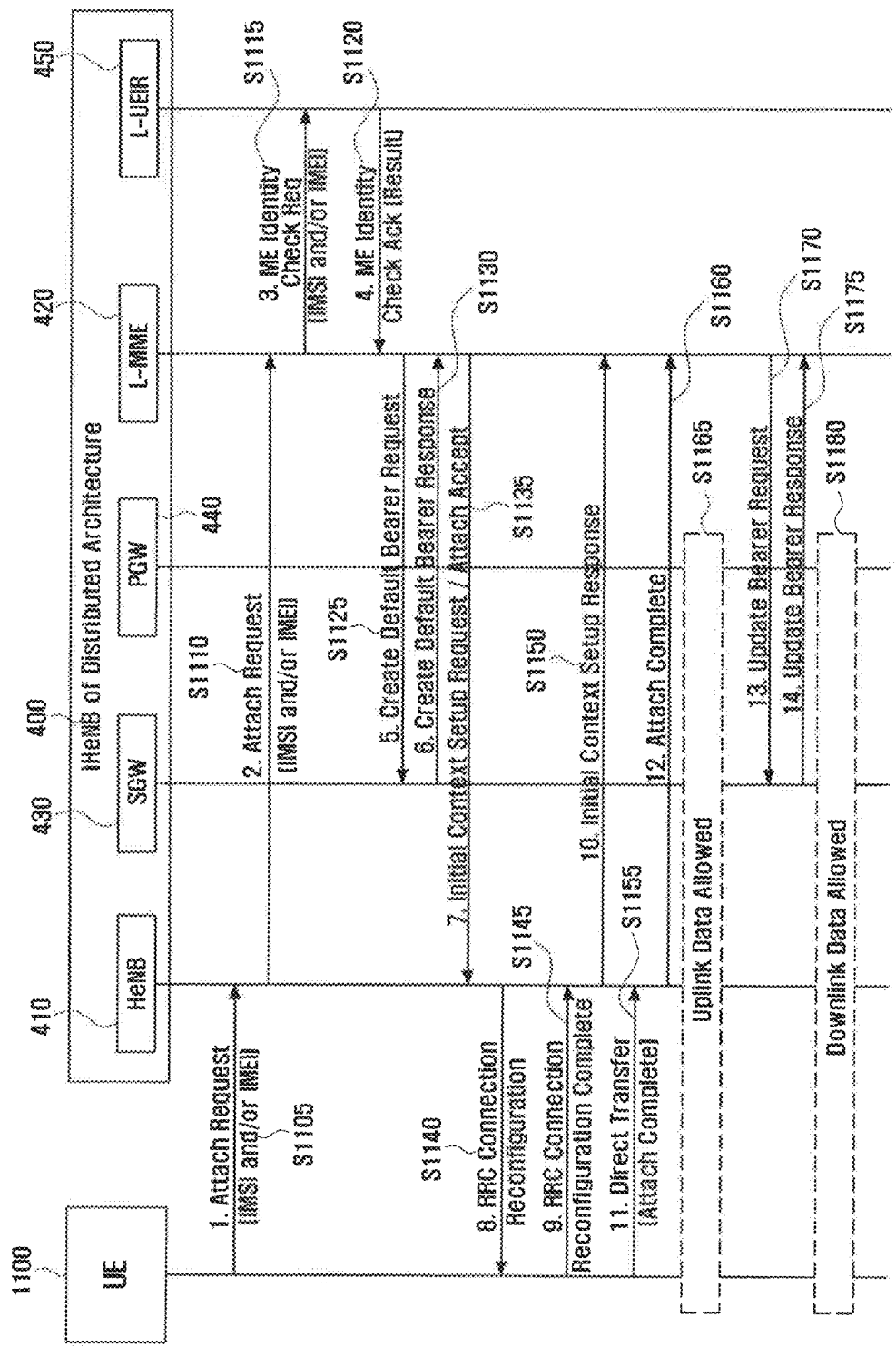
FIG. 11 is a signaling diagram illustrating an authenticated/registered UE procedure for receiving communication service via iHeNB 400 according to the present invention.

FIG. 11 is a signaling diagram illustrating an authenticated/registered UE procedure for receiving communication service via iHeNB 400 according to the present invention.

First, the authenticated/registered UE 1100 transmits an Attach Request message to the iHeNB 400 to establish a connection with the iHeNB 400 at step S1105. Here, the Attach Request message can include at least one of IMSI information as authentication information and IMEI information as device identity information provided from the subscriber identity module 740.

Upon receipt of the Attach Request message, the iHeNB 400 transfers the Attach Request message to the local MME 420 implemented in the iHeNB 400 at step S1110. The local MME 420 checks the IMSI included in the Attach Request message to verify that the UE transmitted the message is the authenticated/registered UE. Next, the local MME 420 transmits an ME Identity Check Request message to the L-UEIR 450 to determine whether the authenticated/registered UE 1100 is a UE supposed to be accommodated by the iHeNB 400 at step S1115).

The L-UEIR 450 determines whether to accommodate or reject the authenticated/registered UE 1100 by referencing the whitelist as shown in FIG. 100. In detail, if the identifier of the authenticated/registered UE 1100 is registered with the whitelist, the L-UEIR 450 generates an ME Identity Check Ack message for permitting the attach request of the authenticated/registered UE 1100. Otherwise, if the identifier of the authenticated/registered UE 1100 is not registered with the whitelist, the L-UEIR 450 generates an ME Identity Check Ack message for rejecting the attach request of the authenticated/registered.

The L-UEIR 450 forwards the ME Identity Check Ack message to the local MME 420 at step S 1120).

The procedure following step S 1120 in FIG. 11 proceeds under the assumption that the identifier of the authenticated/registered UE 1100 is registered with the whitelist.

The local MME 420 transmits a Create Default Bearer Request to the SGW 430 to configure successful wireless broadband communication environment at step 1125 and receives a Create Default Bearer Response as reply.

If the bearer setup process has completed successfully between the SGW 430 and the local MME 420, the local MME 420 transmits an Initial Context Setup Request/Attach Accept message to the HeNB 410 located in the iHeNB 400 to configure radio resource for the authenticated/registered UE 1100 at step S1135. Upon receipt of the message, the HeNB 410 transmits an RRC Connection Reconfiguration message to the authenticated/registered UE 1100 at step S1140 and receives an RRC Connection Reconfiguration Complete message as reply at step 1145. Next, the HeNB 410 transmits an Initial Context Setup Response message to the local MME 420 at step S1150.

Once the radio resource is configured, the authenticated/registered UE 1100 initiates Direct Transfer to complete connection setup at step S1155. If the Direct Transfer is received, the HeNB 410 transmits an Attach Complete message to the local MME 420 to notify of the connection establishment at step S1160.

Afterward, the local MME 420 transmits an Update Bearer Request message to the SGW 400 to complete the connection establishment at step S1170 and receive an Update Bearer Response message from the SGW 400 at step S1175. The SGW 400 instructs to normal communication of data traffic at step S1180.

Thorough the above procedure, it is possible for the authenticated/registered UE 1100 to attach to the communication network normally to receive the service via the proposed iHeNB 400.

As shown in the signaling diagram of FIG. 11, the present invention can be implemented using the procedure and messages specified in the conventional wireless broadband communication standard. However, the present invention proposes the configuration of the iHeNB 400 and new functions of the local MME 420 and L-UEIR 450 implemented in the iHeNB 400. A description is made of the operation of the local MME 420, in case where the iHeNB 400 of the present invention accommodates the authenticated/registered UE and subscriber is described in more detail with reference to FIG. 14.

Figure 14:
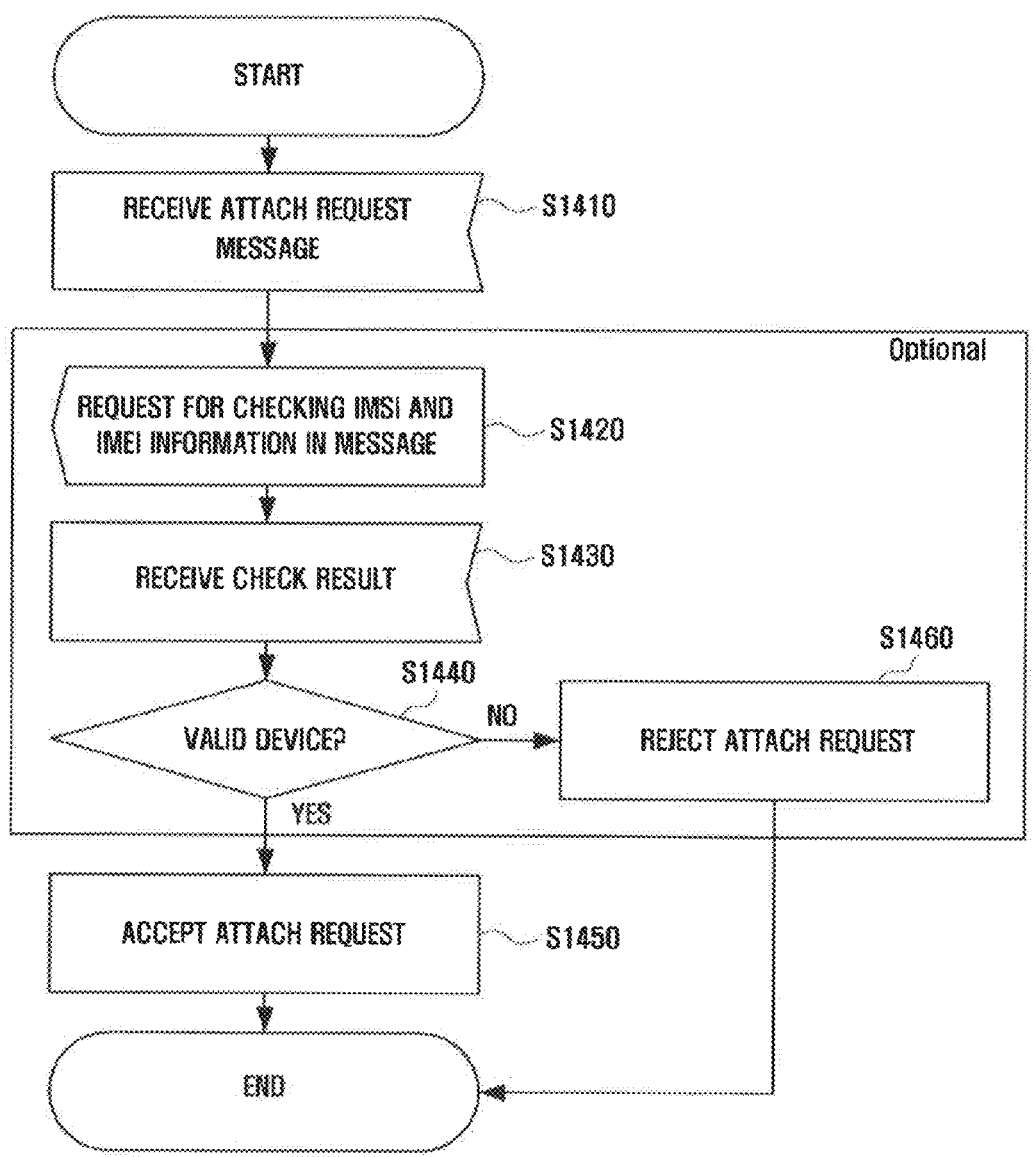
FIG. 14 is a flowchart illustrating the procedure of the local MME 420 of the present invention when the iHeNB 400 accommodates the authenticated/registered UE.

FIG. 14 is a flowchart illustrating the procedure of the local MME 420 of the present invention when the iHeNB 400 accommodates the authenticated/registered UE.

First, the local MME 420 receives an Attach Request generated at the authenticated/registered terminal 1100 in response to the subscriber's request at step S1410. As aforementioned, the Attach Request message includes at least one of IMSI and IMEI. Upon receipt of the Attach Request message, the local MME 420 checks the IMSI and/or IMEI in the Attach Request message. Although the MME can accept the request immediately and transmits acceptance message to the authenticated/registered UE 1100 according to the operator's policy, it is considered in the present invention to determine whether the L-UEIR 450 and the local MME 420 is to accept the Attach Request of the authenticated/registered UE 1100.

Accordingly, the local MME 420 generates a ME Identity Check Request message to check whether the authenticated/registered 1100 is supposed to be accommodated by the iHeNB 400 and transmits the message to the L-UEIR 450 at step S1420. Next, the local MME 420 receives a response message as a reply to the ME Identity Check Request message at step S1430.

If the response message is received, the local MME 420 can determine whether the authenticated/registered UE 1100 is a valid device, i.e. whether the authenticated/registered UE is permitted to the service of the iHeNB 400, at step S1440. If the authenticated/registered UE 1100 is an invalid device, the local MME 420 performs a process for rejecting the Attach Request at step S1460.

Figure 12:
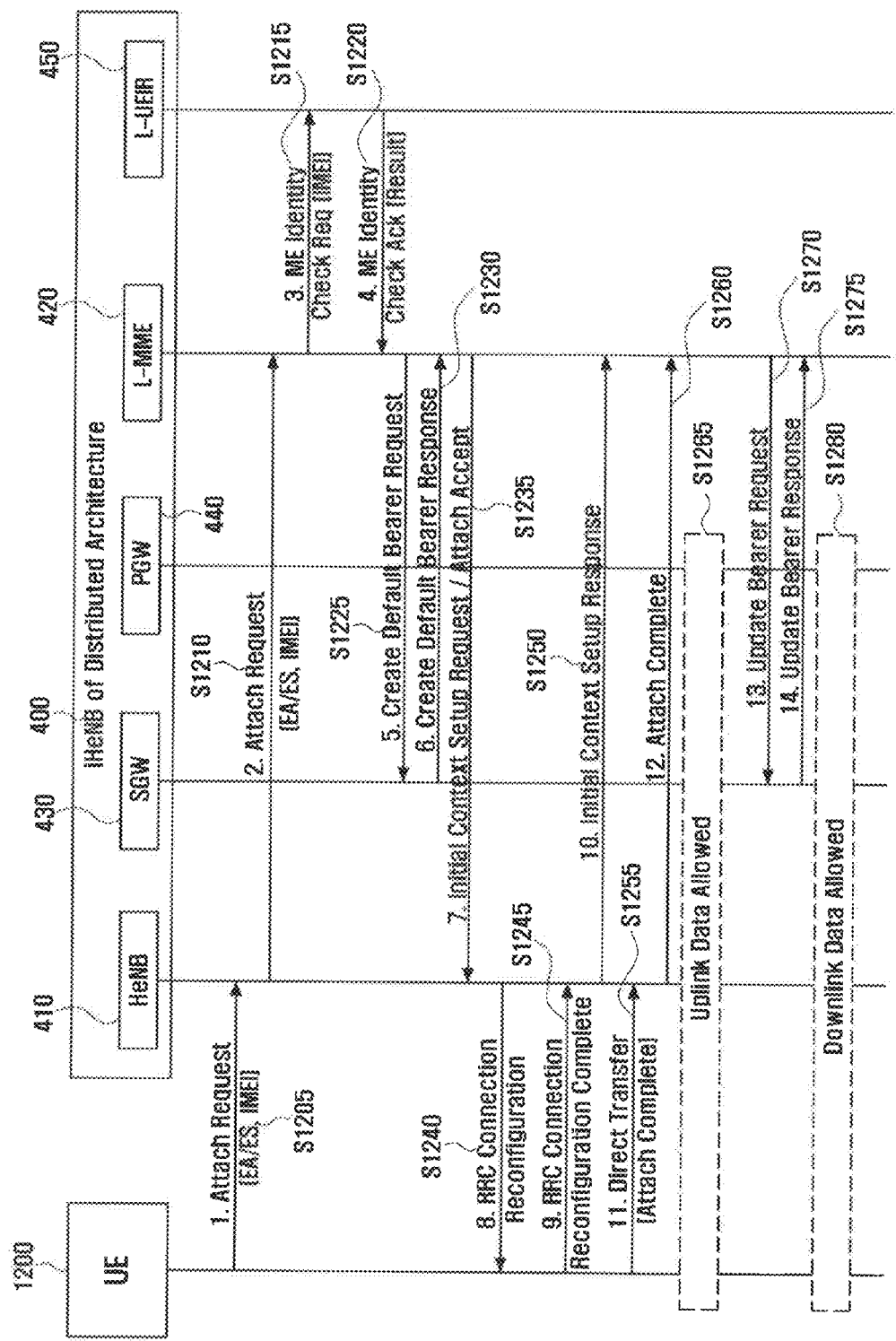
FIG. 12 is a signaling diagram illustrating a procedure for accepting communication of the unauthenticated/unregistered UE 1200 using emergency service option supported by the wireless broadband communication networks.

FIG. 12 is a signaling diagram illustrating a procedure for accepting communication of the unauthenticated/unregistered UE 1200 using emergency service option supported by the wireless broadband communication networks.

For this purpose, the unauthenticated/unregistered UE 1200 transmits an Attach Request message to the iHeNB 400 for establishing a connection with the iHeNB 400 at step S1205. Step S1205 differs from step S1105 of FIG. 11 in that the Attach Request message transmitted by the unauthenticated/unregistered UE 1200 includes IMEI as the UE identifier along with Emergency Attach (EA) or Emergency Service (ES) option rather than IMSI as authentication information.

If the Attach Request message is received, the iHeNB 400 forwards the Attach Request message to the local MME 420 implemented in the iHeNB 400 at step S1210. The local MME 420 checks EA/ES and IMEI included in the Attach Request message to verify that the UE transmitted the message is the unauthenticated/unregistered UE 1200. Next, the local MME 420 generates a ME Identity Check Request message for checking whether the unauthenticated/unregistered UE 1200 is a UE supposed to be served and transmits the message to the L-UEIR 450 at step S1215.

The L-UEIR 450 determines whether to accept or reject the Attach Request of the unauthenticated/unregistered UE 1200 by referencing the whitelist as shown in FIG. 10. In detail, if the identifier of the unauthenticated/unregistered UE 1200 is registered with the whitelist of FIG. 10, the L-UEIR 450 generates the ME Identity Check Ack message accepting the attach request of the unauthenticated/unregistered UE 1200. Otherwise, if the identifier of the unauthenticated/unregistered UE 1200 is not registered with the whitelist, the L-UEIR 450 generates the ME Identity Check Ack message rejecting the attach request of the unauthenticated/unregistered UE 1200. The L-UEIR 450 transmits the ME Identity Check Ack message to the local MME at step S1220.

Since the steps following S1225 are identical with those following S122g of FIG. 11, detailed descriptions thereon are omitted herein.

Figure 15:
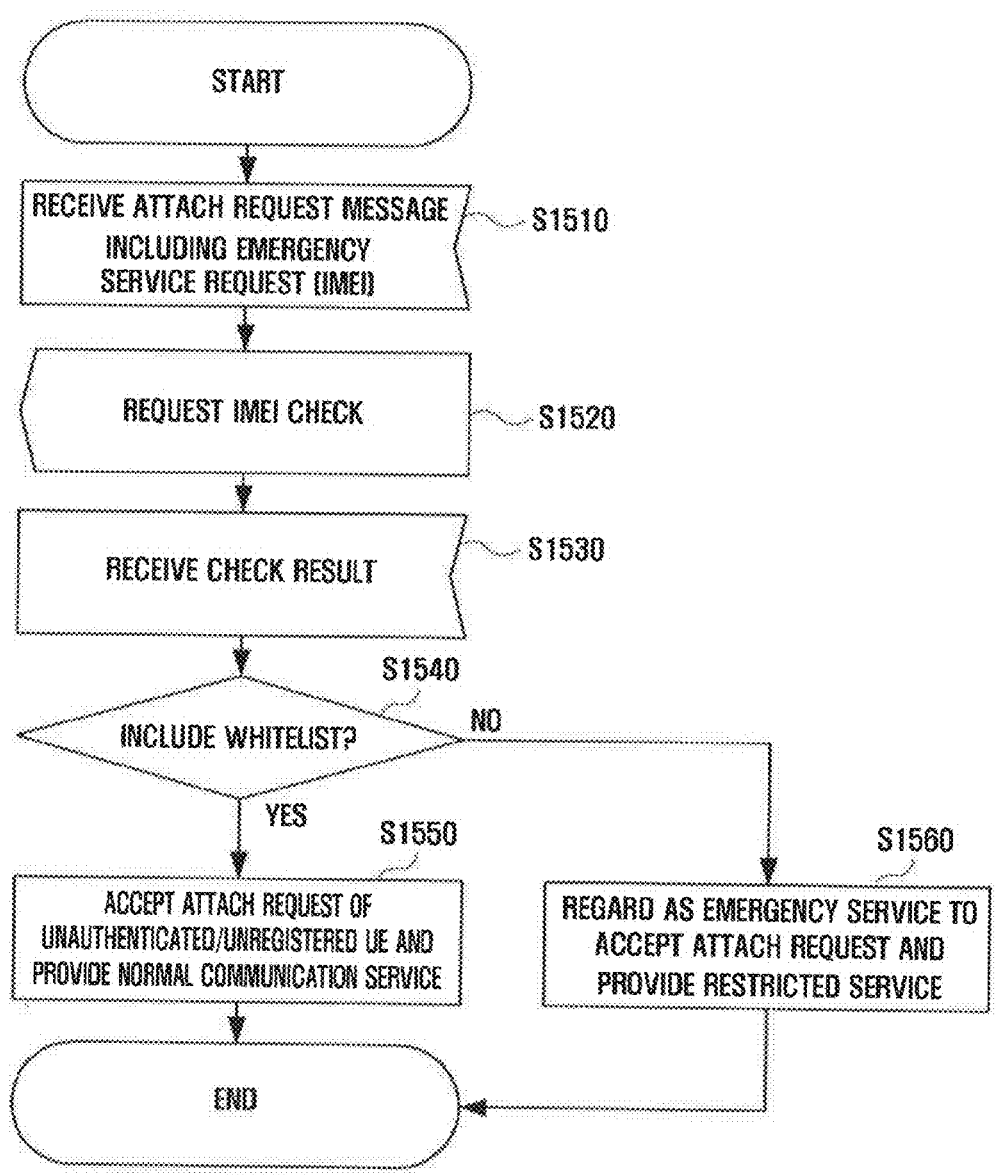
FIG. 15 is a flowchart illustrating the procedure of the local MME 420 when the iHeNB 400 has received an Attach Request message from the unauthenticated/unregistered UE 1200.

FIG. 15 is a flowchart illustrating the procedure of the local MME 420 when the iHeNB 400 has received an Attach Request message from the unauthenticated/unregistered UE 1200.

First, the local MME 420 receives a Attach Request including Emergency Attach (EA) or Emergency Service (ES) option from the unauthenticated/unregistered UE at step S1510. The local MME 420 generates a ME Identity Check Request message including IMEI as device identity information to the L-UEIR 450 at step S1520.

The local MME 420 receives a response message from the L-UEIR 450 at step S1530 and checks whether the attach request is accepted or rejected at step S1540.

If the attach request is accepted, this means that the unauthenticated/unregistered UE 1200 is registered with the whitelist. In this case, the local MME 420 accepts the attach request of the unauthenticated/unregistered UE 1200 to provide the normal communication service at step S1550.

Otherwise, if the attach request is rejected, this means that the unauthenticated/unregistered UE 1200 is not registered with the whitelist and thus the iHeNB cannot provide the UE with the normal communication service. In this case, the MME 420 accommodates the attach request of the unauthenticated/unregistered UE 1200 as emergency call request so as to provide restricted service.

FIG. 15 shows the case where the messages and options used in the conventional wireless broadband communication system are not modified. Accordingly, the local MME 420 should determine whether the attach request of a certain UE is of normal emergency service or of the legal non-restricted normal communication service via a certain HeNB whenever the attach request is received.

Figure 13:
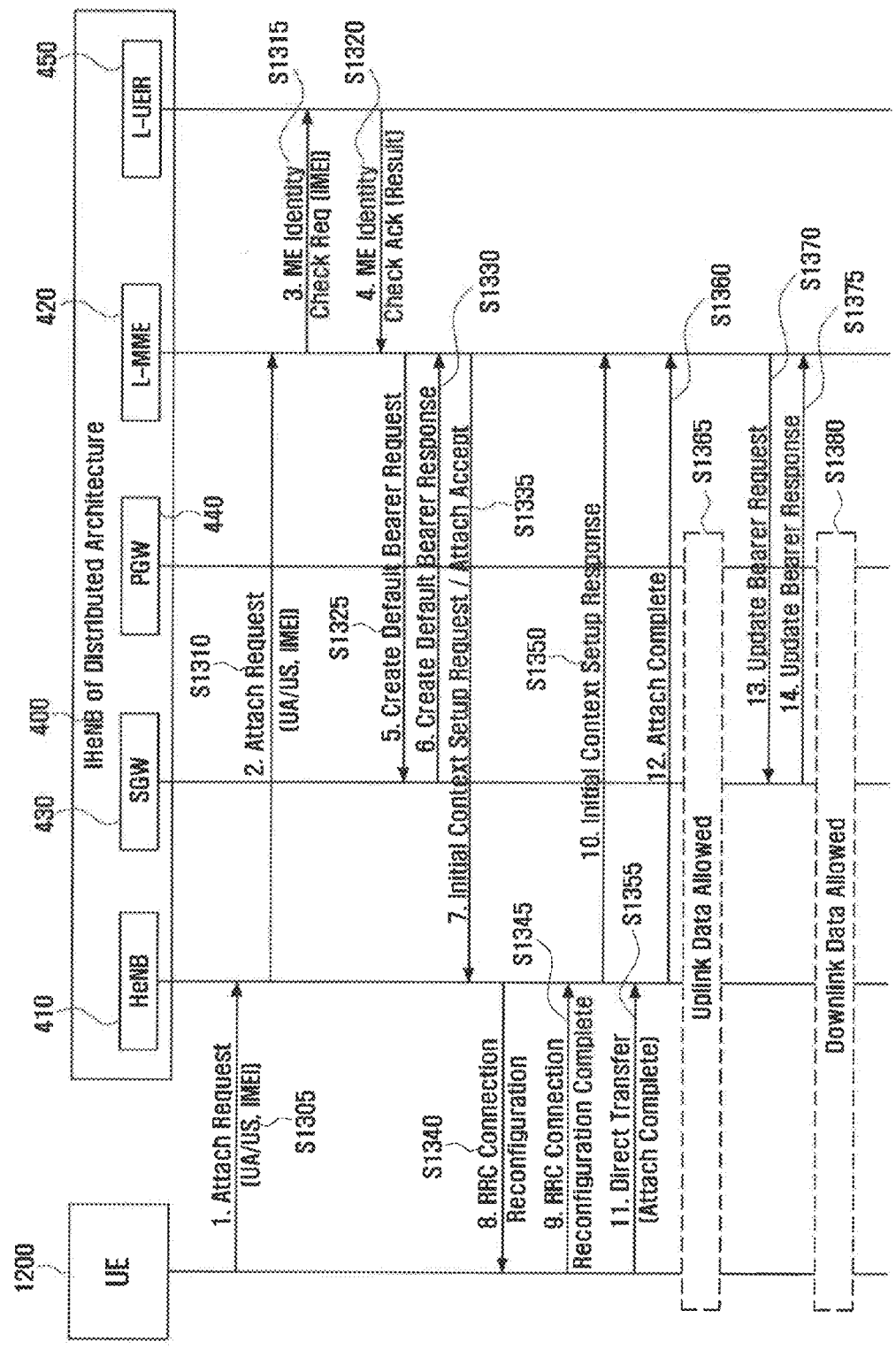
FIG. 13 is a signaling diagram illustrating an operating procedure for the unauthenticated/unregistered UE 1200 to receive communication service legally without restriction via the iHeNB 400.

In FIG. 13, a method for the iHeNB 400 to provide an unauthenticated/unregistered UE 1200 with the communication service legally without restriction is proposed.

In FIG. 13, UA/US service options for Unauthenticated and Unregistered Attach or Service are defined.

The unauthenticated/unregistered UE 1200 transmits an Attach Request message to establish a connection with the iHeNB 400 at step S1305. Unlike step S1105 of FIG. 11 and step S1205 of FIG. 12, step S1205 is characterized in that the attach request message transmitted by the unauthenticated/unregistered UE 1200 includes unauthenticated/unregistered connection (or service) option and IMEI as an identifier of the UE.

The attach request message is forwarded to the local MME 420 at step 1310, and the local MME 420 determines whether to accept or reject the attach request regardless of the service requested. Since steps following S1315 are identical with those following S1215 of FIG. 12, detailed description thereon is omitted herein.

Figure 16:
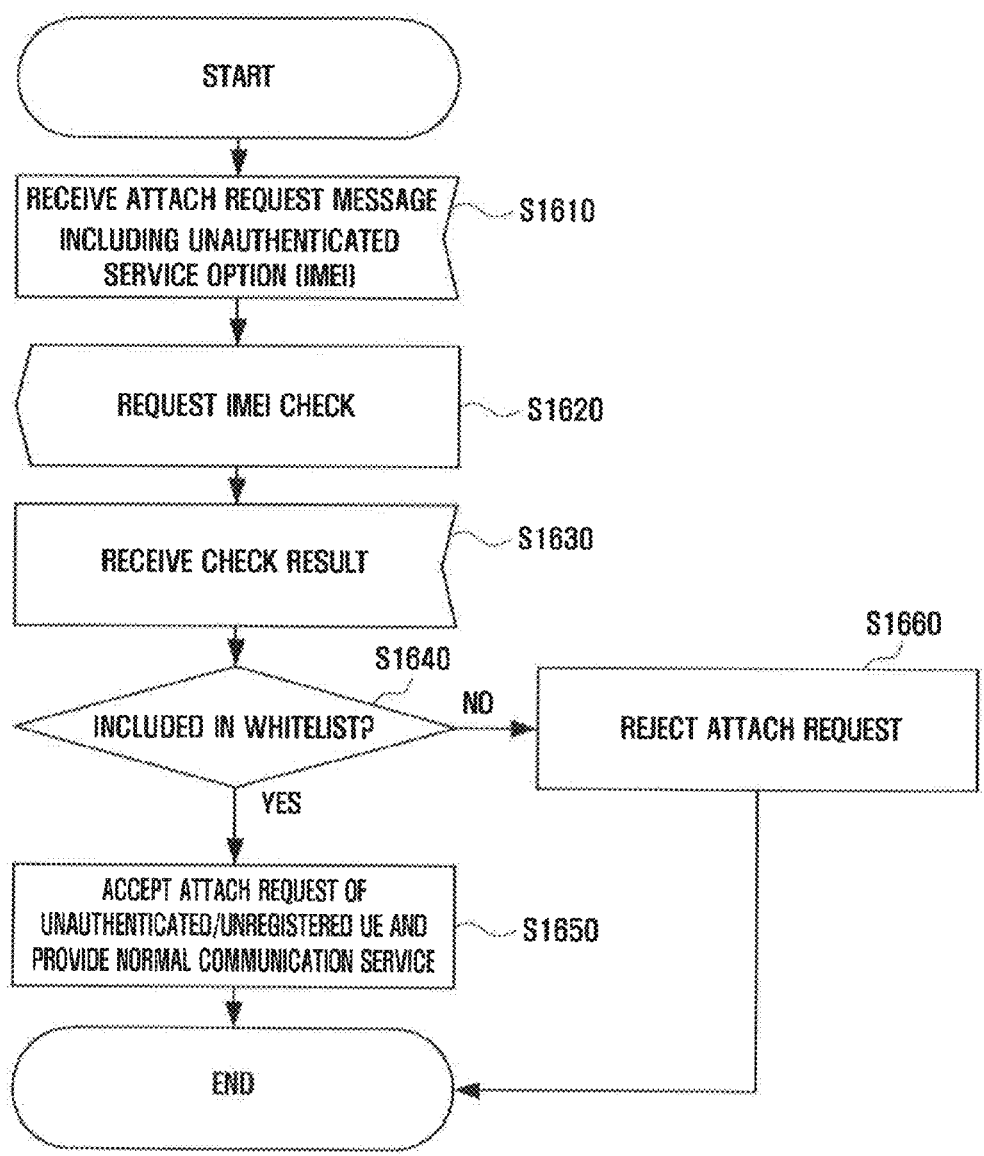
FIG. 16 is a flowchart illustrating operations of the local MME 420 when the iHeNB 400 has received the attach request including unauthenticated/unregistered service option from the unauthenticated/unregistered UE 1200.

FIG. 16 is a flowchart illustrating operations of the local MME 420 when the iHeNB 400 has received the attach request including unauthenticated/unregistered service option from the unauthenticated/unregistered UE 1200.

First, the local MME 420 receives the attach request message including unauthenticated/unregistered service option from the unauthenticated/unregistered UE 1200 at step S1610. The local MME 420 generates a ME Identity Check Request message including IMEI as UE identity information and transfers this message to the L-UEIR 450.

If a response message is received from the L-UEIR 450 at step S1630, the local MME 420 determines whether to accept or reject the attach request at step S1640.

If it is determined to accept the attach request, this means that the unauthenticated/unregistered UE 1200 is registered with the whitelist. In this case, the local MME 420 accepts the attach request of the unauthenticated/unregistered UE 1200 to provide normal communication service at step S1650. Otherwise, if it is determined to reject the attach request, this means that the unauthenticated/unregistered UE 1200 is not registered with the whitelist such that the iHeNB cannot provide the normal communication service. In this case, the local MME 420 rejects the attach request of the unauthenticated/unregistered UE 1200 at step S1660.

In case of providing communication service to the authenticated/registered UE 110, the authenticated/registered UE 1100 can be process in the HeNB. In this case, there is no need for the L-UEIR 450 to check the registration information on the corresponding UE in the whitelist. However, if the network is configured only for specific users in view of the HeNB, it is necessary for the HeNB to determine whether the authenticated/registered UE 1100 is restricted for communication service and provide communication service with restriction. The operations of L-UEIR 450 for such restriction are depicted in in FIG. 17.

Figure 17:
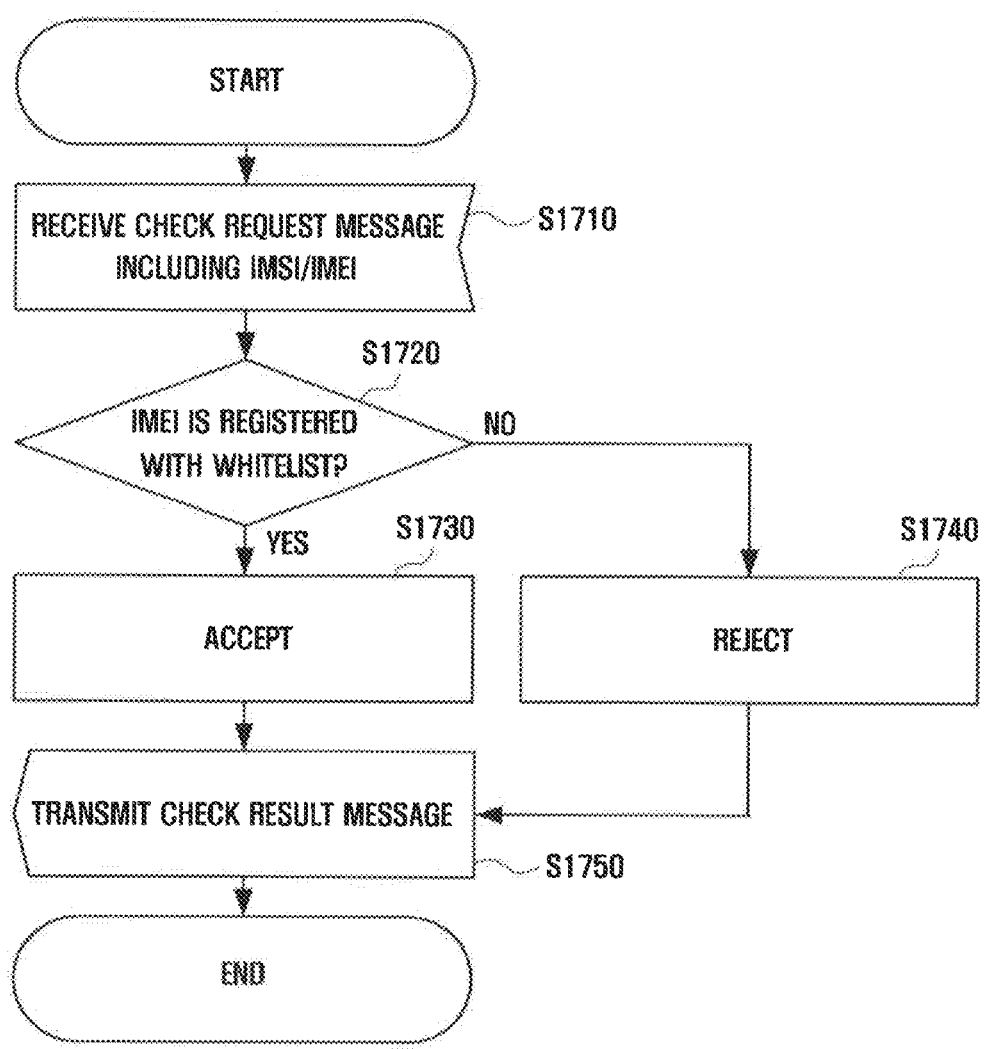
FIG. 17 is a flowchart illustrating a procedure for the L-UEIR 450 to provide the authenticated/restricted UE 1100 with restricted communication service.

FIG. 17 is a flowchart illustrating a procedure for the L-UEIR 450 to provide the authenticated/restricted UE 1100 with restricted communication service.

First, the iHeNB 400 receives the attach request message including IMSI as UE authentication information and IMEI as UE identity information from the authenticated/registered UE 1100. While processing the message, the local MME 420 sends a ME Identity Check Request message including IMSI and IMEI information to the L-UEIR 450 to determine whether the authenticated/registered UE 1100 is supposed to be served by the iHeNB 400.

The L-UEIR 450 receives the ME Identity Check Request message including IMSI and IMEI from the local MME 420 at step S1710. The L-UEIR 450 determines whether the IMEI of the UE is registered with the whitelist at step S1720. If it is determined that the IMEI of the UE is not registered with the whitelist, the L-UEIR 450 generates an ME Identity Check Ack message indicating rejection of the UE's attach request at step S1740 and transmits the ME Identity Check Ack message to the MME 420 at step S1750.

Otherwise, if it is determined that the IEI of the UE is not registered with the whitelist at step S1720, the L-UEIR 450 generates the ME Identity Check Ack message indication acceptance of the UE's attach request at step S1730 and transmits the ME Identity Check Ack message to the MME 420 at step S1750.

Figure 18:
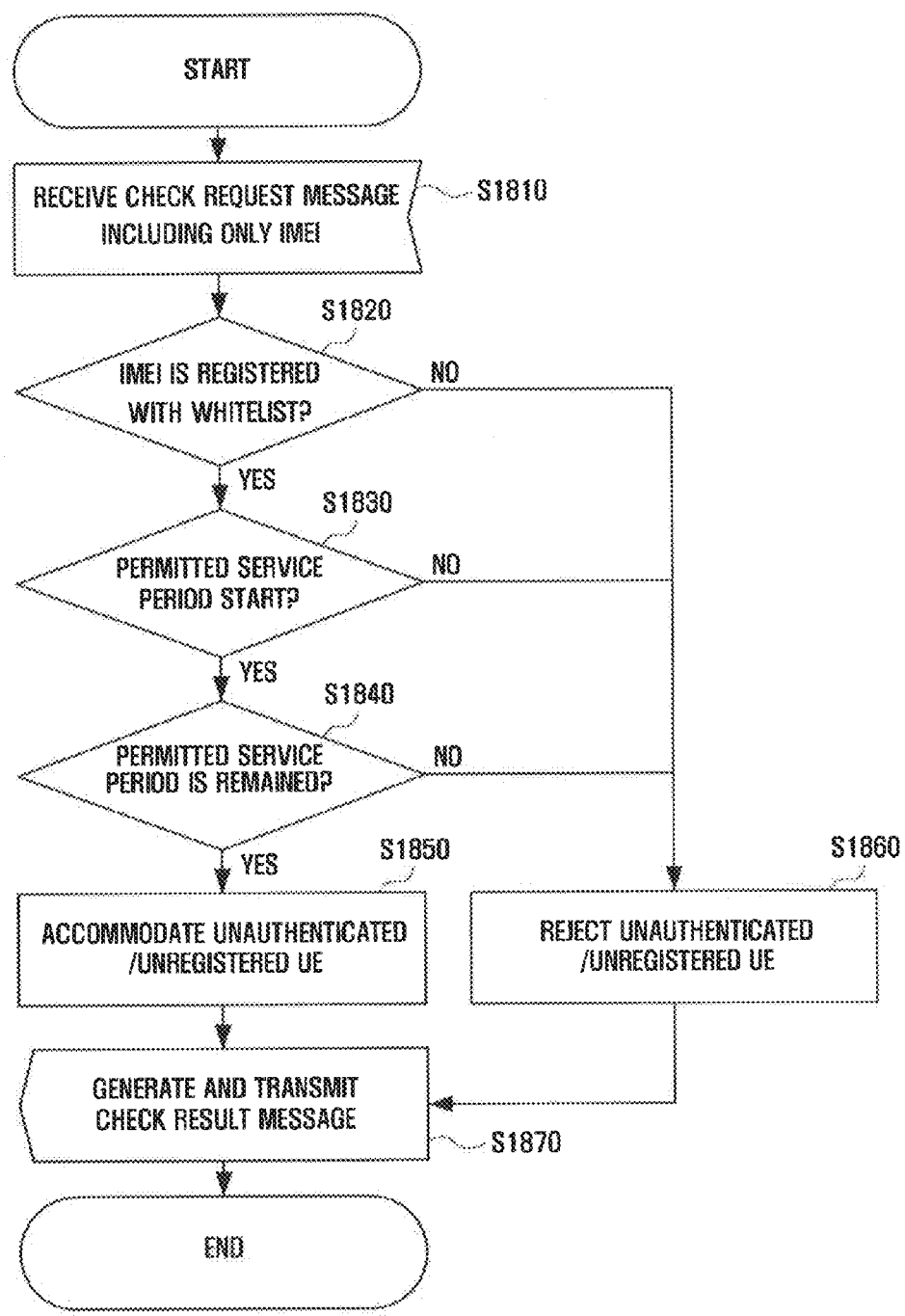
FIG. 18 is a flowchart illustrating an operating procedure of the L-UEIR 450 when an attach request message is received from an unauthenticated/unregistered UE 1200.

FIG. 18 is a flowchart illustrating an operating procedure of the L-UEIR 450 when an attach request message is received from an unauthenticated/unregistered UE 1200.

The attach request message transmitted by the unauthenticated/unregistered UE 1200 includes only IMEI as UE's identity information. The UE 1200 whish has not performed authentication process has no IMSI.

In this case, the L-UEIR 450 receives the ME Identity Check Request message including IMEI information from the local MME 420 at step S1810. The L-UEIR 450 determines whether the UE's IMEI is registered with the whitelist at step S1820. If the UE's IMEI is not registered with the whitelist, the L-UEIR 450 generates an ME Identity Check Ack message for rejecting the attach request at step S1860.

Otherwise, if the UE's IMEI is registered with the whitelist, the L-UEIR 450 determines whether the unauthenticated/unregistered UE service time has started at step S1830. If the unauthenticated/unregistered UE service time has not started, the L-UEIR 450 generates an ME Identity Check Ack message for rejecting the attach request at step S1860.

Otherwise, if the unauthenticated/unregistered UE service time has started, the L-UEIR 450 determines whether the unauthenticated/unregistered UE service time has expired at step S1840. If the unauthenticated/unregistered UE service time has expired, the L-UEIR 450 generates an ME Identity Check Ack message for rejecting the attach request at step S1860.

Otherwise, if the unauthenticated/unregistered UE service time has not expired, the L-UEIR 450 generates an ME Identity Check Ack message for accepting the attach request at step S1850, and sends the ME Identity Check Ack message to the local MME 420 at step S1870.

The ME Identity Check Ack message for accepting the attach request of the unauthenticated/unregistered UE 1200 includes the information as shown in FIG. 19. That is, the information includes a result code indicating whether the attach request is accepted or rejected, a Reason field including a code of addition explanation thereon, and DeviceID such as IMEI/MEID of the unauthenticated/unregistered UE of which attach request is accepted. Also, the information on the service which the unauthenticated/unregistered UE 1200 is permitted in the iHeNB 400 is transferred, and this information includes the information on whether to permit data service only or along with circuit voice or IMS voice service. Also, the information on the start time of the unauthenticated/unregistered UE service (Permitted Service Allowed) and end time of the service (Permitted Service Period).

Figure 20:
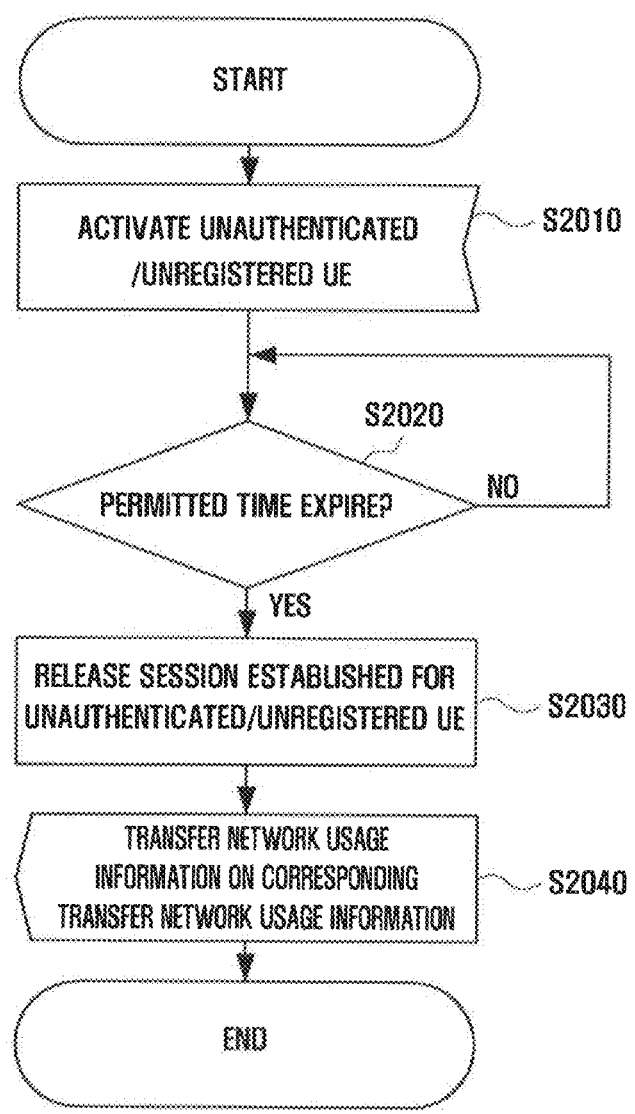
FIG. 20 is a flowchart illustrating a procedure for the local MME 420 to monitor the communication service provided to the unauthenticated/unregistered UE 1200 according to an embodiment of the present invention.

FIG. 20 is a flowchart illustrating a procedure for the local MME 420 to monitor the communication service provided to the unauthenticated/unregistered UE 1200 according to an embodiment of the present invention.

If a predetermined time has elapsed after starting the communication service provision to the unauthenticated/unregistered UE 1200, the local MME 420 stops communication service to the unauthenticated/unregistered UE 1200. For this purpose, the local MME 420 starts providing communication service to the unauthenticated/unregistered UE 1200 at step S2010.

The local MME 420 monitors to determine whether the communication service time has expired periodically at step S2020. If the communication service time has expired, the local MME 420 releases the session established for the unauthenticated/unregistered UE 1200 to stop providing the service at step S2030. Next, the MME 420 sends network usage information of the unauthenticated/unregistered UE 1200 to the L-UEIR 450.

Figure 21:
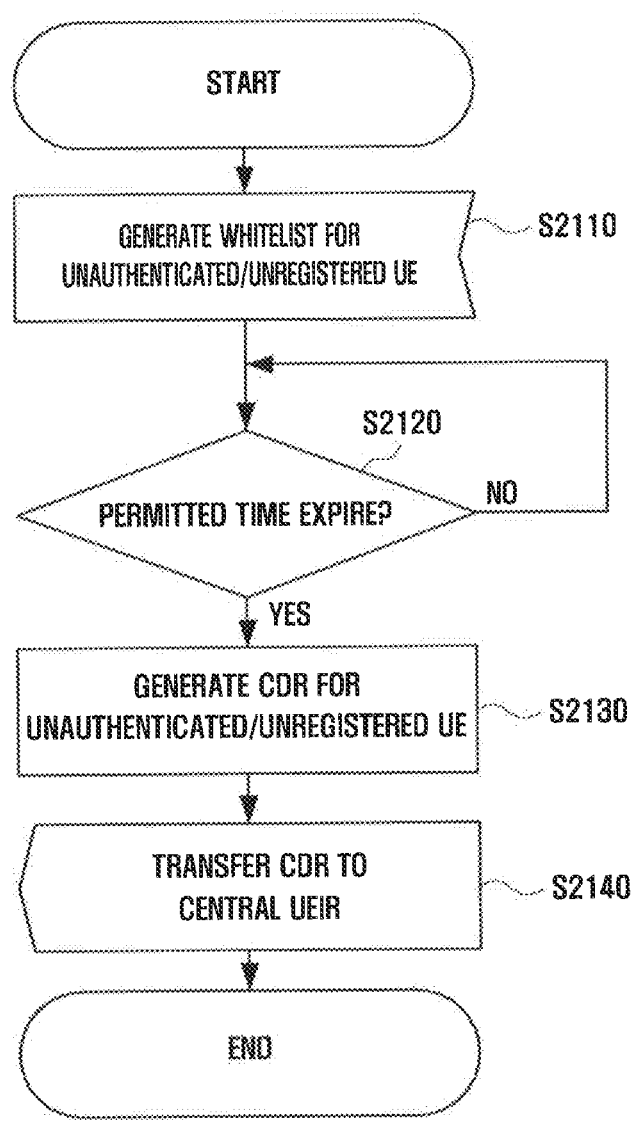
FIG. 21 is a flowchart illustrating a procedure for the L-UEIR 450 to monitor the communication service provided to the unauthenticated/unregistered UE 1200 according to an embodiment of the present invention.

FIG. 21 is a flowchart illustrating a procedure for the L-UEIR 450 to monitor the communication service provided to the unauthenticated/unregistered UE 1200 according to an embodiment of the present invention.

First, the whitelist for the unauthenticated/unregistered UE 1200 is generated through the central UE Identity Register and User's control/management procedure at step S2110. The L-UEIR 450 monitors to determine periodically whether the allowed communication service provision time for unauthenticated/unregistered UE 1200 has expired at step S2120. If the service provision time has expired, the L-UEIR 450 generates a Call Detail Report (CDR) for the unauthenticated/unregistered UE 1200 at step S2130. Next, the L-UEIR 450 transmits the CDR to the central UE Identity register at step 2140.

<Second Embodiment>

The second embodiment of the present invention proposes a hybrid

HeNB having the functions of the conventional core network entities, i.e. whole SGW and PGW functions and partial MME function, and the hybrid HeNB terminates all the data protocols and some signal protocols. In more detail, the hybrid HeNB terminates the signal protocol for providing an unauthenticated/unregistered UE with communication service directly and consigns the control of the signal protocol for providing an authenticated/registered UE with the communication service to the core network.

In the second embodiment of the present invention, all the data protocols are terminated at the hybrid HeNB, and the signal protocols are terminated at the core network or the hybrid HeNB selectively. The reason why the hybrid HeNB supports the signal protocols selectively is to allow the hybrid HeNB to support dedicated service such that the hybrid HeNB is capable of terminating the signal protocol by itself for the service specialized to fit the home/business network. As aforementioned, this is an auxiliary signal protocol termination device in the type of supporting the functions dedicated to the home/business network but not for all the signal protocols. A description is made of the method for providing the unauthenticated/unregistered UE 1200 with communication service via the hybrid HeNB hereinafter with reference to FIG. 22.

Figure 22:
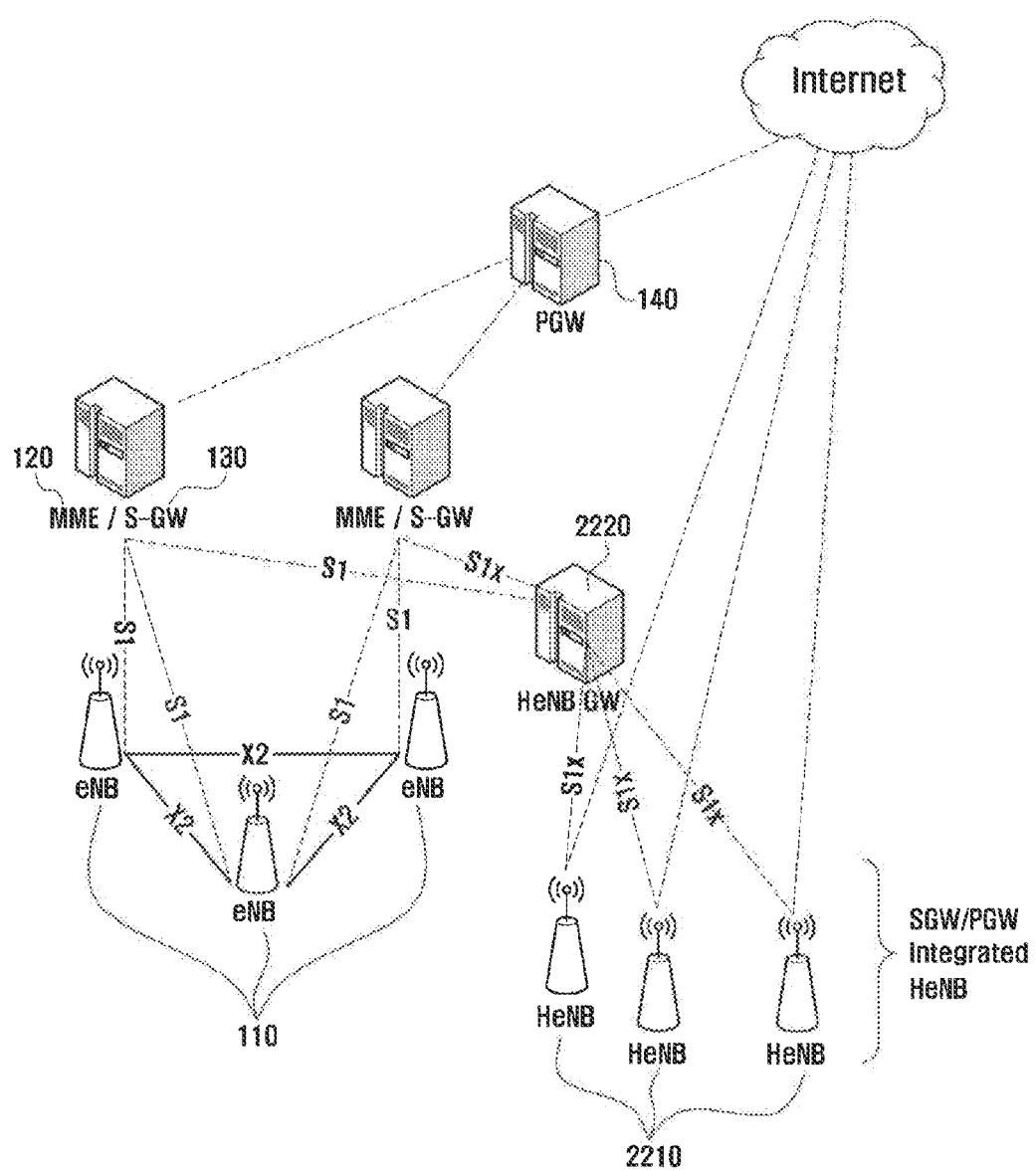
FIG. 22 is a conceptual diagram illustrating the concept for providing unauthenticated/unregistered UE 1200 with communication service via a hybrid HeNB 2210.

FIG. 22 is a conceptual diagram illustrating the concept for providing unauthenticated/unregistered UE 1200 with communication service via a hybrid HeNB 2210. The detailed descriptions on the parts that are already described with reference to FIGS. 1 and 3 are omitted herein.

As shown in FIG. 22, the lines expressing the data flows connect the hybrid HeNBs 2210 to the Internet directly. Meanwhile, the line expressing the signal protocol connects the hybrid HeNBs 2210 to the MME 120 of the core network via HeNB GWs 2220. The hybrid HeNB 2210 of the present invention terminates all the bearer-related protocols by itself without involvement of the SGW 130 and PGW 140 of the core network and transmits and received user traffic to and from the Internet directly.

Figure 23:
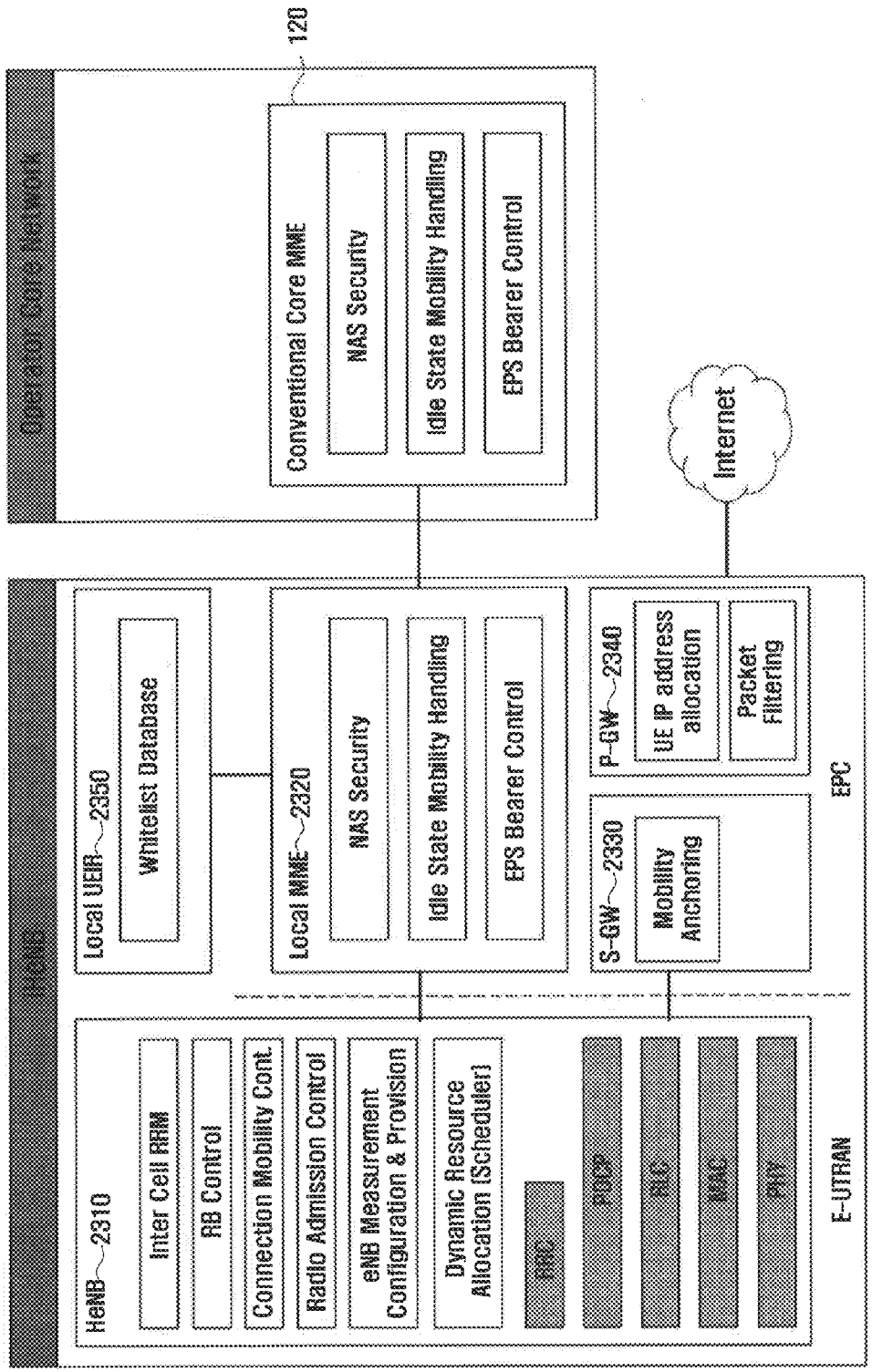
FIG. 23 is a diagram illustrating network function distribution of the hybrid HeNB 2210 of the present invention.

FIG. 23 is a diagram illustrating network function distribution of the hybrid HeNB 2210 of the present invention.

As shown in FIG. 23, the hybrid HeNB 2210 of the present invention includes the functions of Local Unauthenticated/User Equipment Identity Register (L-UEIR) 2350 for managing authentication/registration information of the subscriber and UE along with the functions of the SGW 2330 and PGW 2340 as core network functions.

The hybrid HeNB 2210 also includes a local MME 2320 for processing the home/business signal protocol. The local MME 2320 of the hybrid HeNB 2210 differs from the local MME 420 of the iHeNB 400 in that the local MME 2320 of the hybrid HeNB processes the indoor (home or business) service for the case of processing the signal protocol and communicates with the MME 120 of the core network for the case where an interface to outdoor network is necessary.

Since the HeNB 2310, SGW 2330, PGW 2340, and L-UEIR 2350 has been described with reference to FIG. 4, detailed descriptions thereon are omitted herein.

Although the hybrid HeNB 2210 provides the unauthenticated/unregistered UE 1200 with communication service, it may be necessary to control and manage the hybrid HeNB 2210. In the present invention a network interface is defined to achieve this purpose with reference to FIG. 24.

Figure 24:
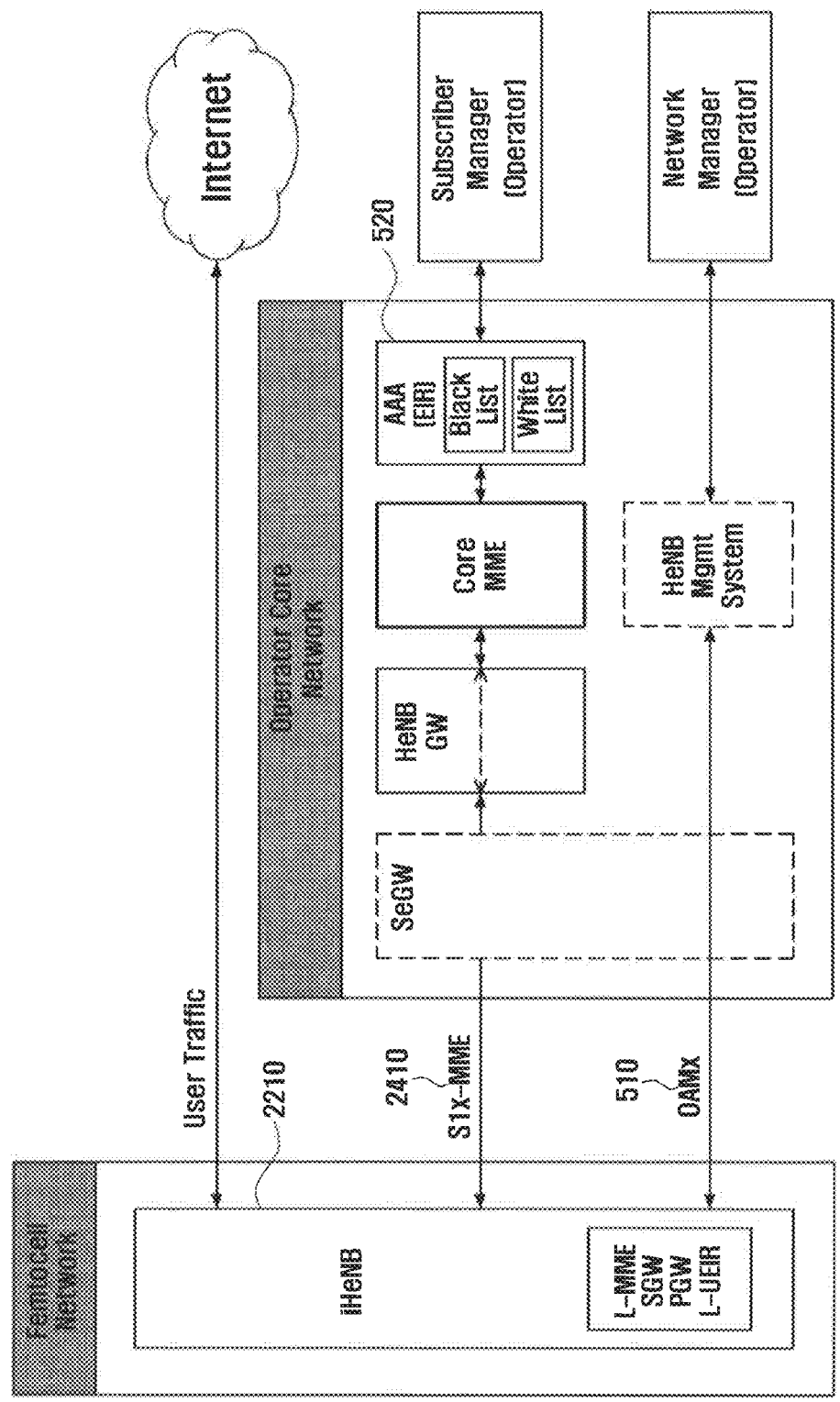
FIG. 24 is a diagram illustrating a network interface in the wireless communication network including the hybrid HeNB 2210.

FIG. 24 is a diagram illustrating a network interface in the wireless communication network including the hybrid HeNB 2210.

As shown in FIG. 24, the terminations of specific (home-bound or business-bound) signal protocol and all data protocols are integrated in the hybrid HeNB 2210. The OAM interface for managing the hybrid HeNB 2210 is provide with an interface for connection to an operator network manager and OAMx interface 510 and S1x-MME interface 2410 defined additionally for the user to monitor and control/manage authenticated/registered apparatuses and devices.

That is, the operator communicates with the L-UEIR 2350 in the hybrid HeNB 2210 via AAA/EIR 520 as subscriber authentication/registration server entity of the core network through S1x-MME interface 2410. In this manner, the operator can monitor the information on the UEs permitted and rejected by the hybrid HeNB 2210 via the AAA/EIR 520 of the core network. The operator also can transfer certain information to the L-UEIR of the hybrid HeNB 2210 through the S1x-MME interface 2410, if necessary.

In order to carry out such procedure, the AAA/EIR 520 of the core network includes the function for processing the UE and subscriber authentication/registration information.

Figure 25:
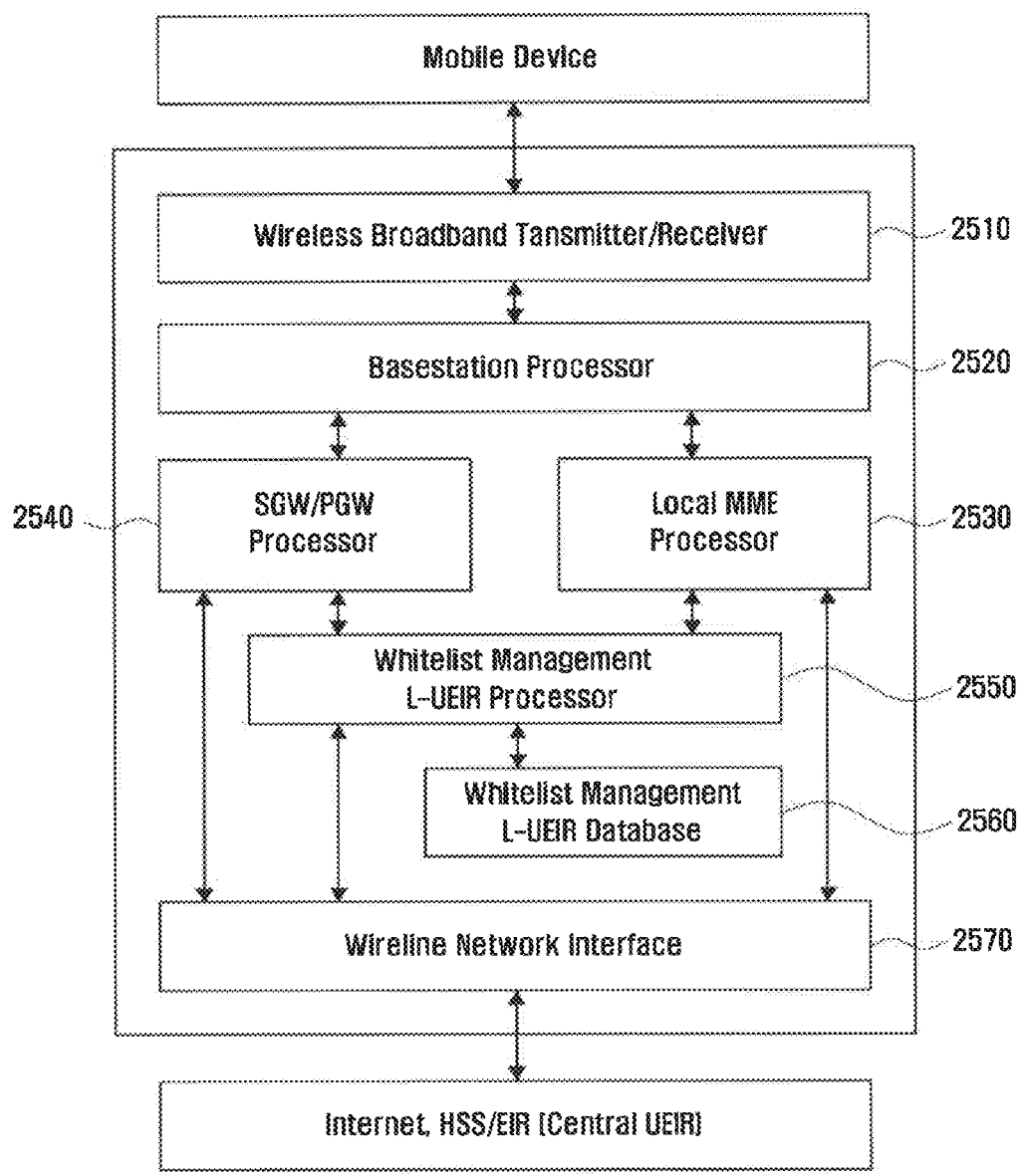
FIG. 25 is a diagram illustrating the configuration of the hybrid HeNB 2210 of the present invention.

FIG. 25 is a diagram illustrating the configuration of the hybrid HeNB 2210 of the present invention. As shown in FIG. 25, the hybrid HeNB 2210 includes a Wireless Broadband Transmitter/Receiver 2510, a Base Station Processor 2520, a local MME processor 2530, a SGW/PGW processor 2540, a Whitelist Management L-UEIR Processor 2550, a Whitelist Management L-UEIR Database 2560, and a Wireline Network Interface 2570.

The detailed descriptions on the features of the hybrid HeNB of FIG. 25 that are similar to those of the iHeNB 400 of FIG. 6 are omitted herein.

The difference between the hybrid HeNB 2210 according to the second embodiment of the present invention and the iHeNB 400 according to the first embodiment is that the local MME processor 2530 of the hybrid HeNB 2210 leaves the processing of the signal protocol for authenticated/registered UE 1100 to the core network while processing the signal protocol for unauthenticated/unregistered UE 1200 by itself For this purpose, when an attach request message is received, the local MME processor 2530 checks the authentication information or identity information included in the message. If the message includes IMSI as authentication information, this means that the message is transmitted by the authenticated/registered UE 1100 and thus the local MME processor 2530 leaves the signal protocol process for the message to the MME 120 of the core network.

If the message includes IMEI as identity information but not IMSI as authentication information, this means that the message is transmitted by unauthenticated/unregistered UE 1200 and thus the local MME processor 2530 processes the signal protocol for the message by itself Since the configuration of the authenticated/registered UE according to an embodiment of the present invention has been described with reference to FIG. 7 or 8, and the configuration of the unauthenticated/unregistered UE has been described with reference to FIG. 9, the detailed descriptions thereon are omitted herein.

Also, since the structure of the whitelist maintained and managed by the hybrid HeNB 2210 of the present invention has been described with reference to FIG. 10, detailed description thereon is omitted herein.

Figure 26:
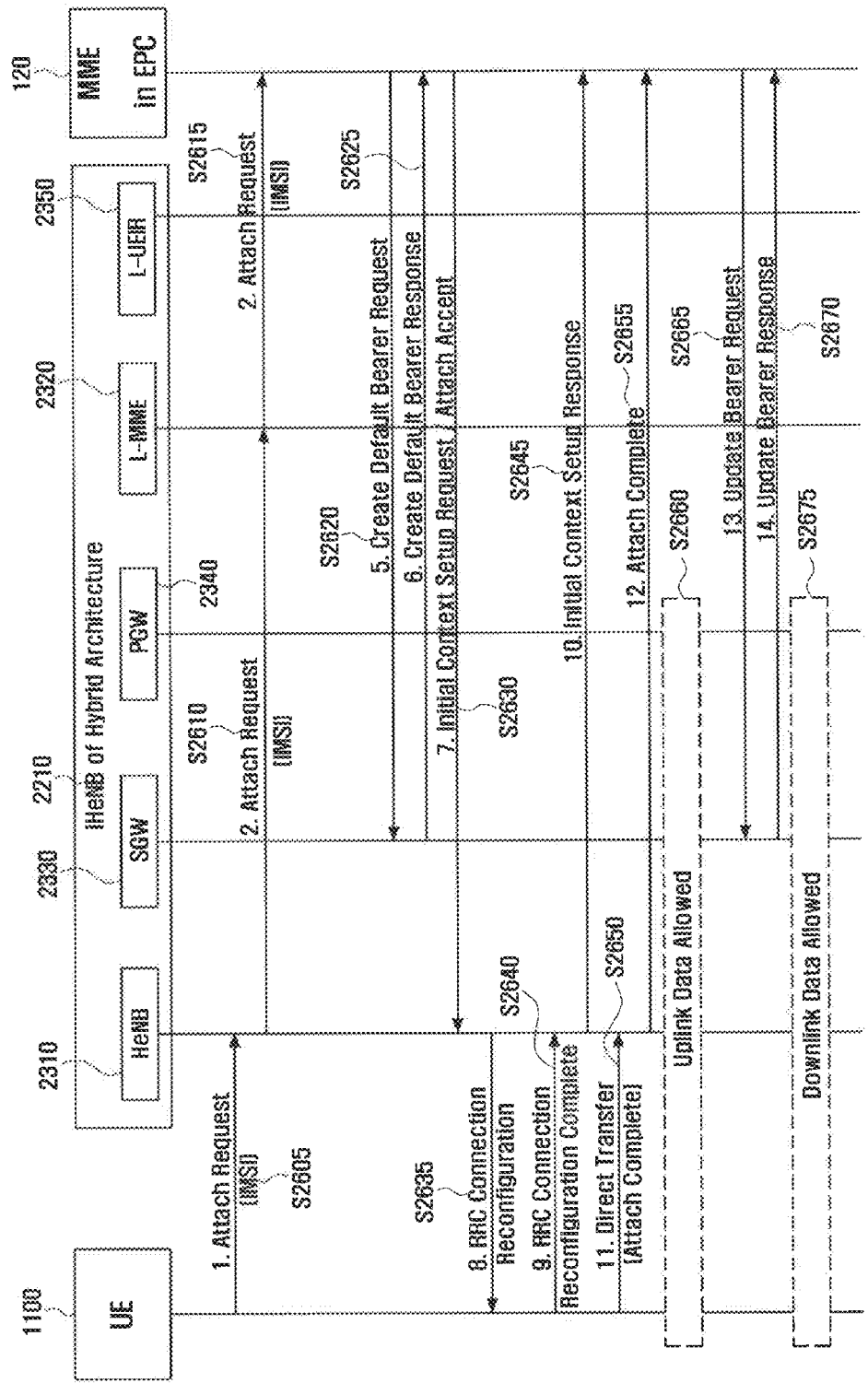
FIG. 26 is a signaling diagram illustrating a procedure for authenticated/registered UE 1100 of the present invention to receive communication service via the hybrid HeNB 2210.

FIG. 26 is a signaling diagram illustrating a procedure for authenticated/registered UE 1100 of the present invention to receive communication service via the hybrid HeNB 2210.

The authenticated/registered UE 1100 transmits an Attach Request message to the hybrid HeNB 2310 for establishing connection to the hybrid HeNB 2310 at step S2605. In this case, the attach request message can include at least one of IMSI as authentication information and IMEI as device identity information.

Upon receipt of the attach request message, the hybrid HeNB 2210 forwards the attach request message to the local MME 2320 implemented in the hybrid HeNB 2210 at step S2610. The local MME checks IMSI included in the attach request message to identify the UE transmitted the message as authenticated/registered UE 1100. In this case, the local MME 2320 leaves the processing of the attach request message to the MME 120 of the core network. That is, the local MME 2320 bypasses all of the messages from the authenticated/registered messages.

The local MME 2320 forwards the attach request message received from the authenticated/registered UE 1100 to the MME 120 of the core network at step S2615.

Since the steps following S2620 of FIG. 26 are identical with those following S1125 of FIG. 11, detailed descriptions thereon are omitted herein. However, since the local MME 2320 has left the message processing procedure to the core network MME 120, the signals related to the message processing are exchanged with the core network MME 120 but not the local MME 2320. Through the above procedure, the authenticated/registered UE 1100 can access the communication network normally to receive communication service.

Although not depicted in FIG. 26, if it is aimed to provide the authenticated/registered UE 1100 with dedicated service in the corresponding home/business network, the hybrid HeNB 2210 asks the L-UEIR 2350 for whether the UE is registered with the corresponding service. The L-UEIR 2350 determines whether to accept or reject the service request of the UE and, if the UE is registered with the service, the local MME processes the message from the UE by itself As shown in the signaling diagram of FIG. 26, the present invention can be implemented using the procedure and messages specified in the conventional wireless broadband communication standard. However, the present invention proposes the configuration of the hybrid HeNB 2210 and new functions of the local MME 2320 and L-UEIR 2350 implemented in the hybrid HeNB 2210. A description is made of the procedure for the local MME 2320 to accept the access request of the authenticated/registered UE 1100.

Figure 30:
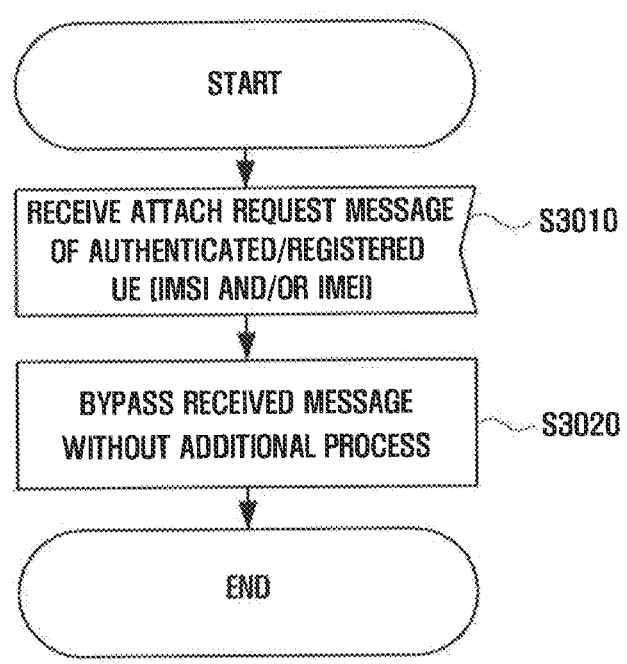
FIG. 30 is a flowchart illustrating a procedure for the local MME 2320 of the hybrid HeNB of the present invention to accept the attach request of the authenticated/registered UE 1100.

FIG. 30 is a flowchart illustrating a procedure for the local MME 2320 of the hybrid HeNB of the present invention to accept the attach request of the authenticated/registered UE 1100.

First, the local MME 2320 receives an attach request message from the authenticated/registered UE 1100 at step S3010. In this case, the attach request message includes IMSI as authentication information and IMEI as UE identity information. The local MME 2320 checks the IMSI included in the attach request message to identify the UE transmitted the attach request message has been authenticated/registered. The local MME 2320 bypasses the received message to the core network MME 120 without processing the message at step S3020.

Figure 27:
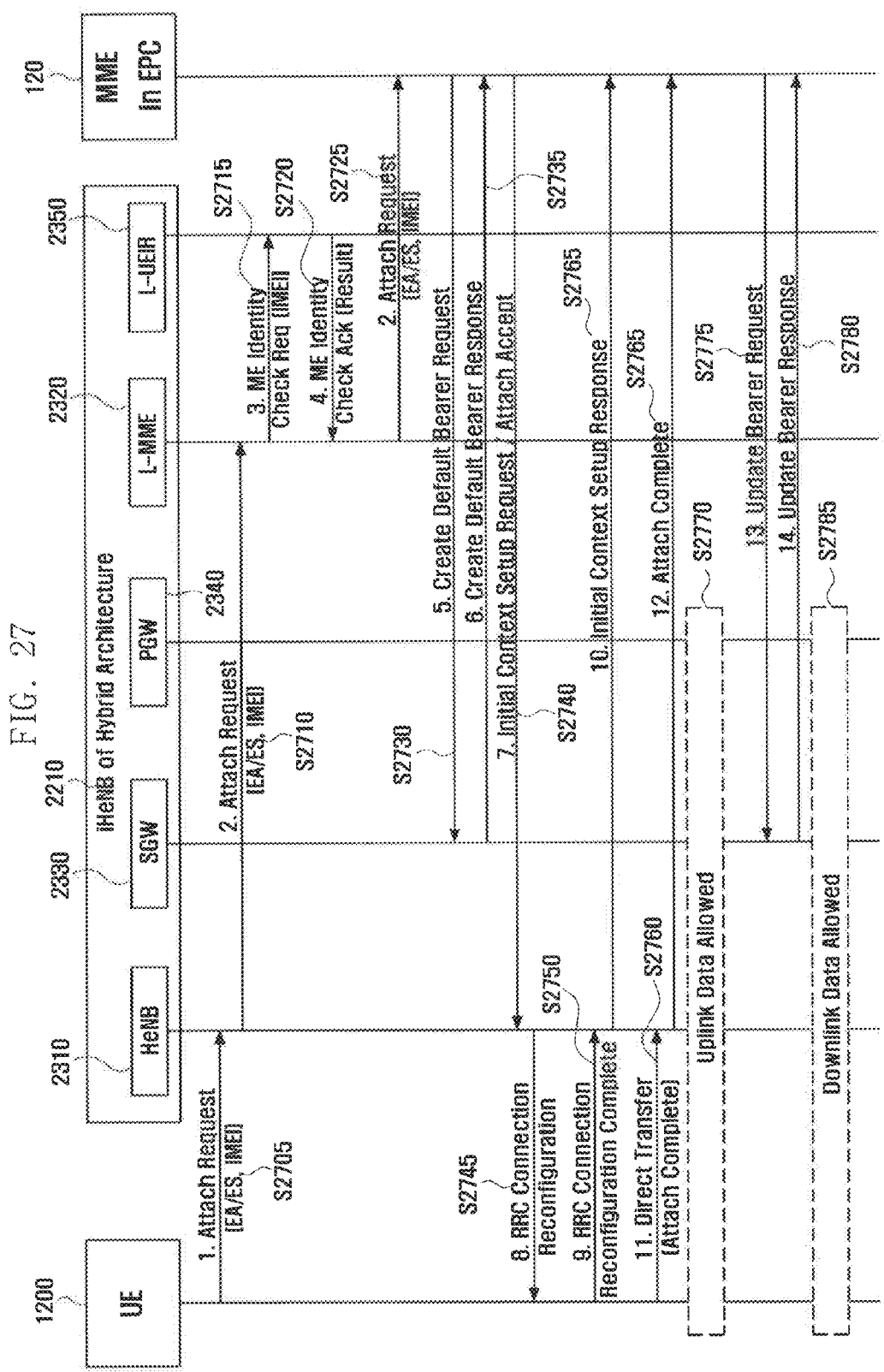
FIG. 27 is a signaling diagram illustrating a procedure for the hybrid HeNB 2210 to accept the communication of the unauthenticated/unregistered UE 1200 with emergency service option.

FIG. 27 is a signaling diagram illustrating a procedure for the hybrid HeNB 2210 to accept the communication of the unauthenticated/unregistered UE 1200 with emergency service option.

In this case, the unauthenticated/unregistered UE 1200 is the UE which is not permitted to use the normal communication service provided by the hybrid HeNB 2210, i.e. not registered with the whitelist of the L-UEIR 2350. The embodiment of FIG. 27 proposes an emergency call service provision procedure provided to the unauthenticated/unregistered UE 1200 in emergency situation.

The unauthenticated/unregistered UE 1200 transmits an Attach Request message to the hybrid HeNB 2210 to establish a connection to the hybrid HeNB 2210 at step S2705. Step S2705 differs from step S2605 of FIG. 26 in that the attach request message transmitted by the unauthenticated/unregistered UE 1200 includes Emergency Attach (EA) or Emergency Service (ES) option along with IMSI as the UE identifier but not IMSI as authentication information.

Upon receipt of the attach request message, the hybrid HeNB 2210 forwards the attach request message to the local MME 2320 implemented in the same device at step S2710. The local MME 2320 checks the EA/ES and IMEI included in the attach request message to identify the UE transmitted the message as the unauthenticated/unregistered UE 1200. The local MME 2320 generates an ME Identity Check Request message asking for whether the unauthenticated/unregistered UE 1200 is registered with the corresponding service and transfers the ME Identity Check Request message to the L-UEIR 2350.

The L-UEIR 2350 determines whether to accept or reject the unauthenticated/unregistered UE 1200 by referencing the whitelist. If the unauthenticated/unregistered UE 1200 has been registered with the whitelist, the L-UEIR 2350 generates an ME Identity Check Ack message for accepting the attach request of the unauthenticated/unregistered UE 1200. Otherwise, if the unauthenticated/unregistered UE 1200 has not been registered with the whitelist, the L-UEIR 2350 generates the ME Identity Check Ack message for rejection the attach request of the unauthenticated/unregistered UE 1200. The L-UEIR 2350 transfers the ME Identity Check Ack message to the local MME 2320 at step 52720.

Here, the UEs which has not been registered with the whitelist cannot receive the normal communication service through the hybrid HeNB 2210. In this case, the local MME 2320 regards the attach request of the UE as emergency communication request and lets the core network MME 120 process the corresponding message. For this purpose, the local MME 2320 bypasses the attach request message to the core network MME 120 at step S2725. Since the steps following S2730 are identical with those following S2620 of FIG. 26, detailed descriptions thereon are omitted wherein.

Otherwise, the UE which has been registered with the whitelist can receive the normal communication service through the hybrid HeNB 2210. In this case, the local MME accepts the attach request of the unauthenticated/unregistered UE 1200 to provide the normal communication service. The detailed procedure for providing the normal communication service to the unauthenticated/unregistered UE 1200 is described with reference to FIG. 28.

Figure 28:
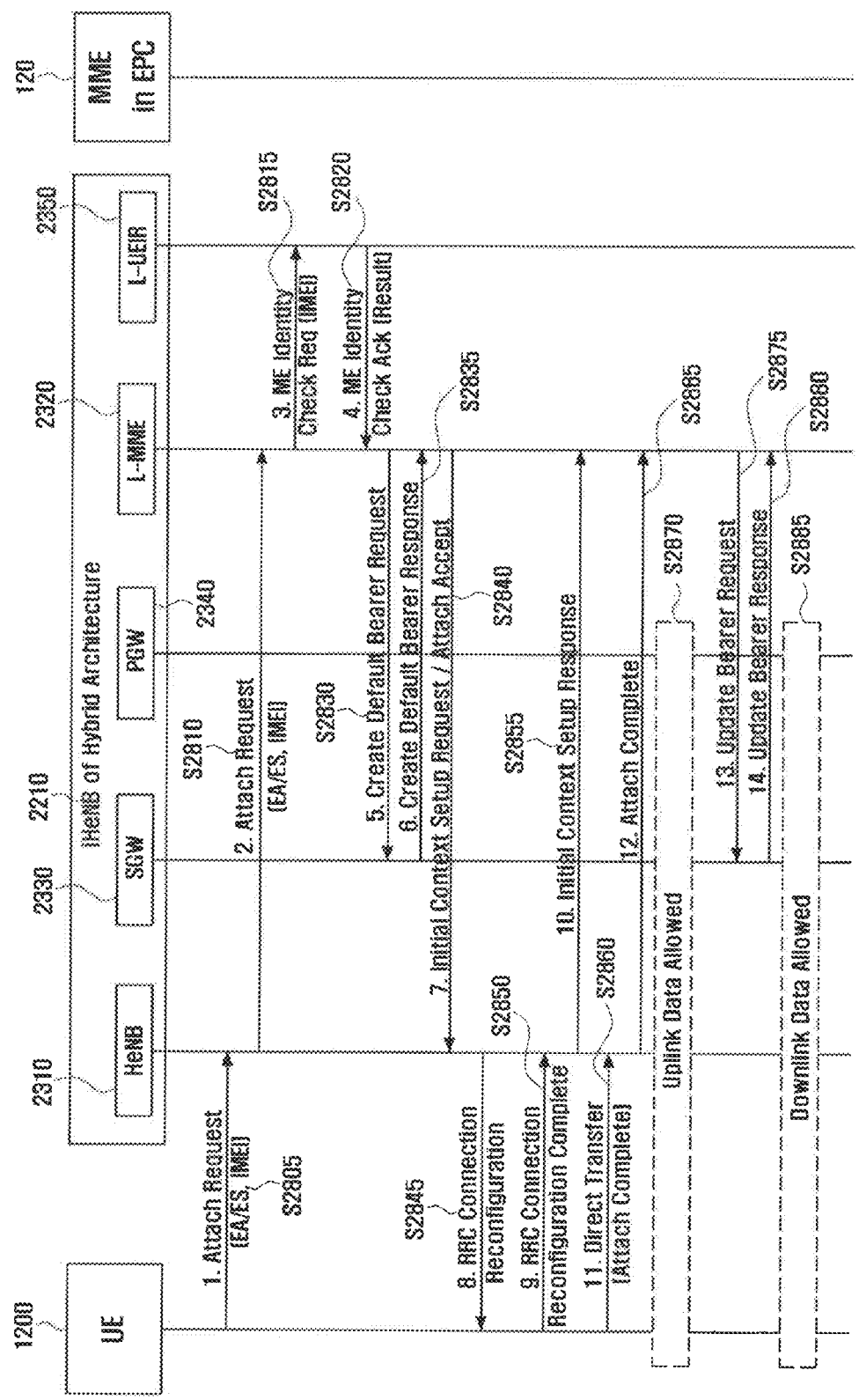
FIG. 28 is a signaling diagram illustrating a procedure for providing the unauthenticated/unregistered UE 1200 with normal communication service using emergency service option via the hybrid HeNB 2210 of the present invention.

FIG. 28 is a signaling diagram illustrating a procedure for providing the unauthenticated/unregistered UE 1200 with normal communication service using emergency service option via the hybrid HeNB 2210 of the present invention.

The embodiment of FIG. 28 differs from that of FIG. 27 in that the unauthenticated/unregistered UE 1200 transmitted the attach request message has been registered with the whitelist. In this case, the local MME 2320 accepts the attach request of the unauthenticated/unregistered UE 1200 instead of the core network MME 120 and performs the rest procedure following step S2830 for providing the normal service. Since the steps following S2830 are identical with those following S1125 of FIG. 11, detailed descriptions thereon are omitted herein.

Figure 31:
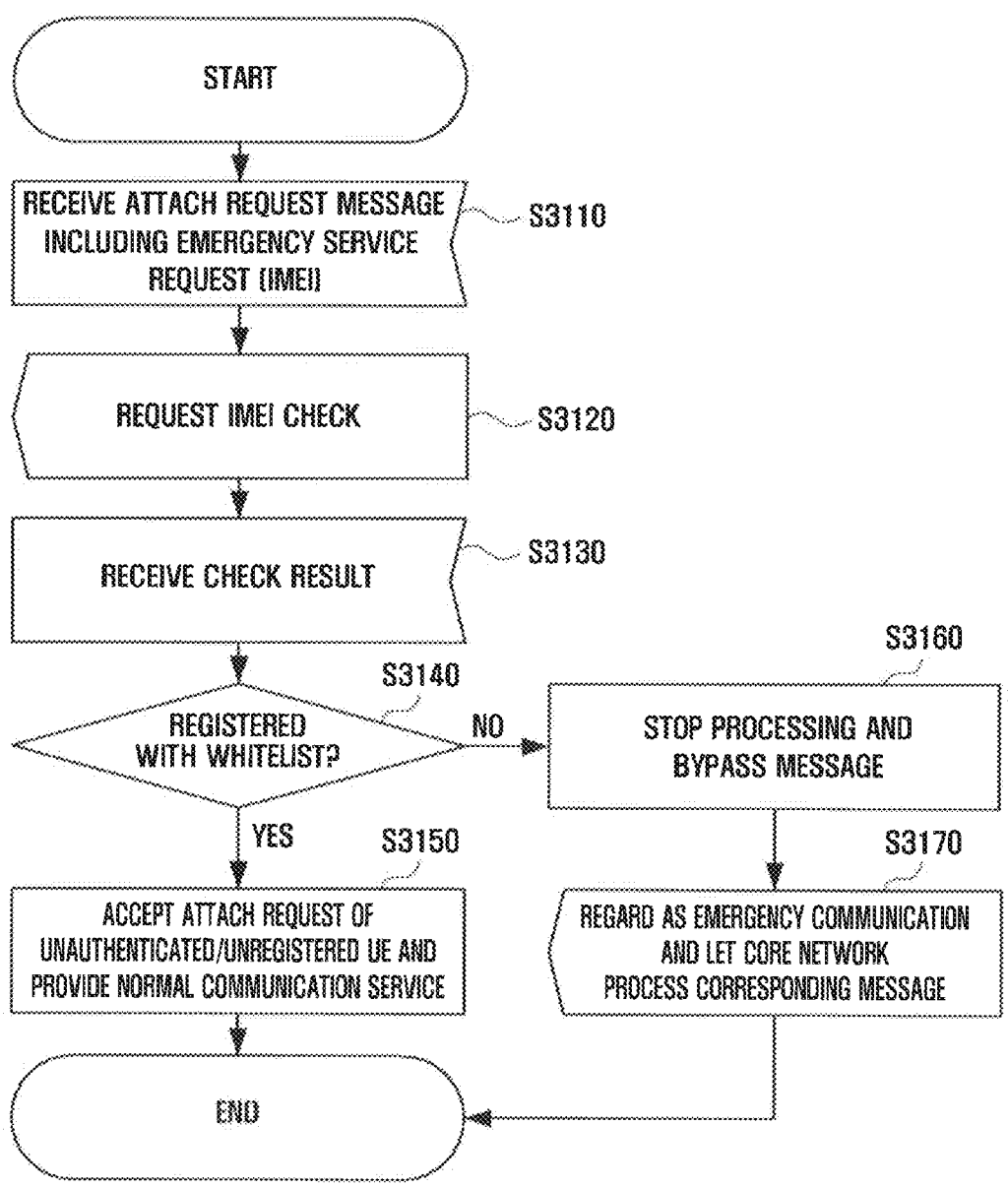
FIG. 31 is a flowchart illustrating a procedure for the local MME 2320 to provide the unauthenticated/unregistered UE 1200 with emergency service or normal communication service using emergency service option.

FIG. 31 is a flowchart illustrating a procedure for the local MME 2320 to provide the unauthenticated/unregistered UE 1200 with emergency service or normal communication service using emergency service option.

First, the local MME 2320 receives an attach request message including EA or ES option from the unauthenticated/unregistered UE 1200 at step S3110. The local MME 2320 generates an ME Identity Check Request message including IMEI as device identity information and transfers the ME Identity Check Request message to the L-UEIR 2350 at step S3120.

Next, the local MME 2320 receives an ME Identity Check Ack message from the L-UEIR 2350 at step S3130 and determines whether to accept or reject the attach request at step S3140.

If the attach request is accepted, this means that the unauthenticated/unregistered UE 1200 has been registered with the whitelist. In this case, the local MME 2320 accepts the attach request to provide the unauthenticated/unregistered UE 1200 with the normal communication service.

Otherwise, if the attach request is not accepted, this means that the unauthenticated/unregistered UE 1200 has not been registered with the whitelist such that the hybrid HeNB 2210 cannot provide the normal communication service. In this case, the local MME 2320 regards the attach request of the unauthenticated/unregistered UE 1200 as emergency call request at step S3160 and lets the core network MME 120 process the attach request message.

In the above described methods, the messages and options used in the conventional wireless broadband communication system are not modified. Accordingly, the local MME 2320 has to determine whether the attach request from the UE is of emergency service or normal communication service legally permitted to a specific HeNB without restriction whenever the attach request is received.

Figure 29:
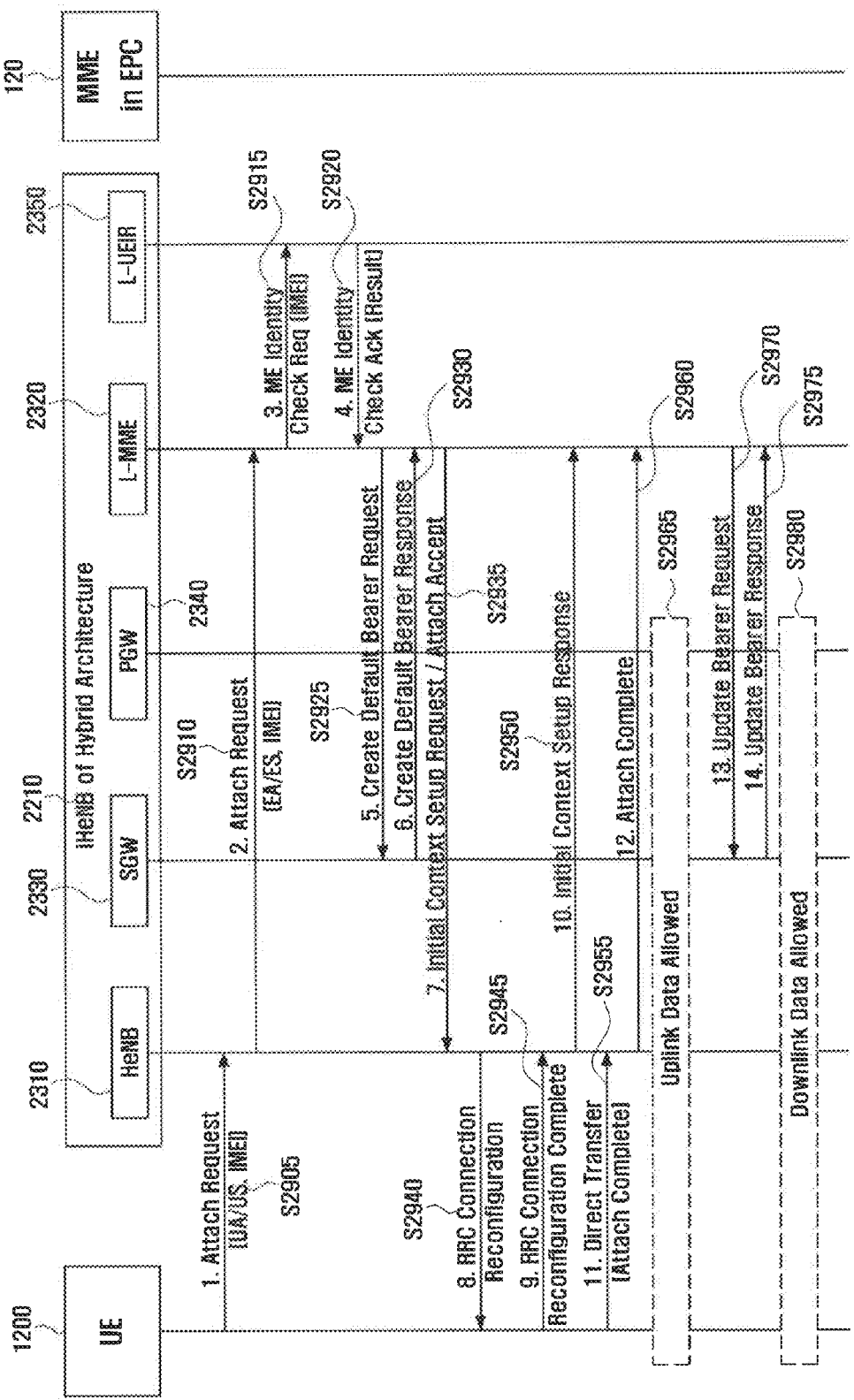
FIG. 29 is a signaling diagram illustrating a procedure for providing the unauthenticated/unregistered UE with Unauthenticated and Unregistered Attach or Service with UA/US service option.

The embodiment of FIG. 29 proposes a method for providing the unauthenticated/unregistered UE 1200 with the communication service legally via the hybrid HeNB without restriction.

FIG. 29 is a signaling diagram illustrating a procedure for providing the unauthenticated/unregistered UE with Unauthenticated and Unregistered Attach or Service with UA/US service option.

The unauthenticated/unregistered UE 1200 transmits an Attach Request message to the iHeNB 2210 to establish a connection to the iHeNB 2210. Step S2905 differs from step S2705 of FIG. 27 and step S2805 of FIG. 28 in that the attach request message transmitted by the unauthenticated/unregistered UE 1200 includes unauthenticated/unregistered attach (or service) option and IMEI as UE identifier.

The attach request message is forwarded to the local MME 2320 such that the local MME 2320 determines whether to accept or reject the attach request without taking notice about the normal emergency service at step S2910. Since the steps following S2915 are identical with those following S2815 of FIG. 28, detailed description thereon are omitted.

Figure 32:
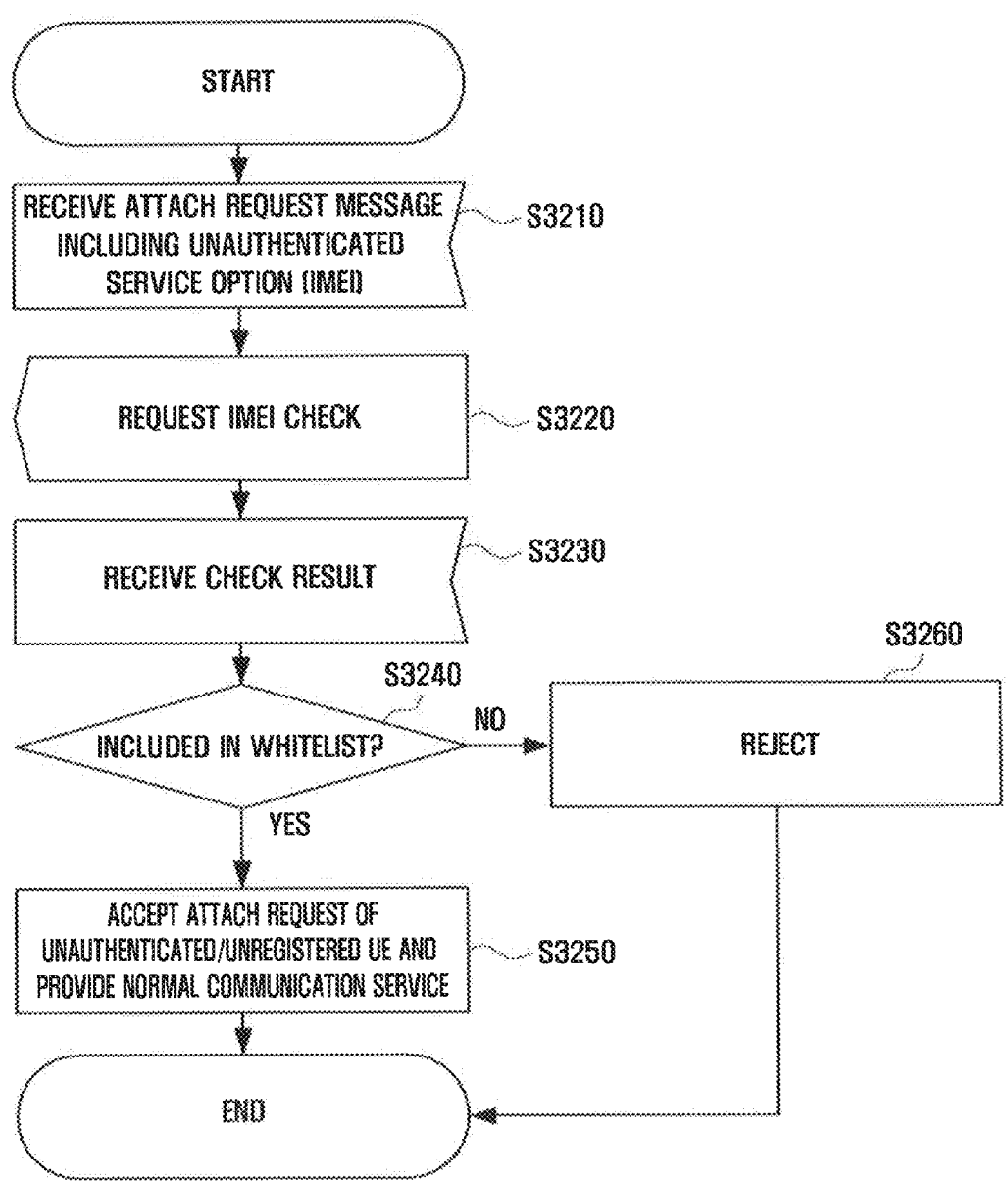
FIG. 32 is flowchart illustrating an operating procedure of the local MME 2320 when the hybrid HeNB 2210 receives an attach request including unauthenticated/unregistered service option from the unauthenticated/unregistered UE 1200.

FIG. 32 is flowchart illustrating an operating procedure of the local MME 2320 when the hybrid HeNB 2210 receives an attach request including unauthenticated/unregistered service option from the unauthenticated/unregistered UE 1200.

First, the local MME 2320 receives the attach request message including unauthenticated/unregistered service option from the unauthenticated/unregistered UE 1200 at step S3210. Next, the local MME 2320 generates an ME Identity Check Request message including IMEI as UE identity information to the L-UEIR 2350 at step S3220.

If a ME Identity Check Ack message is received from the L-UEIR 2350 at step S3230, the local MME 2320 checks whether the attach request has been accepted or rejected.

If the attach request has been accepted, this means that the unauthenticated/unregistered UE 1200 has been registered with the whitelist. In this case, the local MME 420 accepts the access request of the unauthenticated/unregistered UE 1200 to provide the normal communication service at step S3250. Otherwise, if the attach request has been rejected, this means that the unauthenticated/unregistered UE has not been registered with the whitelist such that the hybrid HeNB 2210 cannot provide the normal communication service. In this case, the local MME 2320 rejects the attach request of the unauthenticated/unregistered UE 1200 at step S3260.

In case that the communication service is provided to the authenticated/registered UE 1100, the authenticated/registered UE 1100 can be served by the HeNB in general. In this case, it is unnecessary for the L-UEIR 2350 to check the registration information on the corresponding UE. However, when the network is deployed with a HeNB for specific users, it is necessary to check whether the UE, although authenticated/registered, is restricted to the communication service via the HeNB. The operating procedure of the L-UEIR 2350 for this purpose is depicted in FIG. 33.

Figure 33:
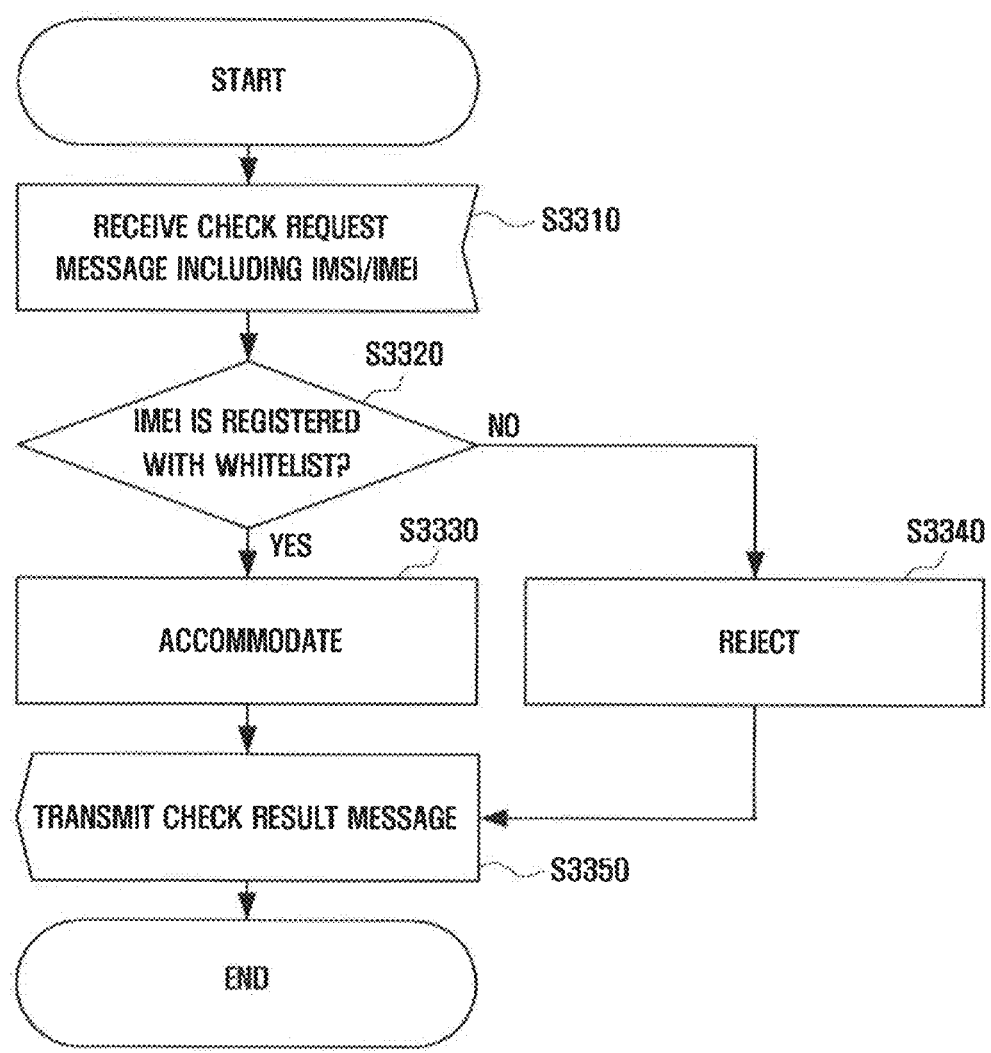
FIG. 33 is a flowchart illustrating an operating procedure of the L-UEIR 2350 for providing restricted communication service to the authenticated/registered UE 1100.

FIG. 33 is a flowchart illustrating an operating procedure of the L-UEIR 2350 for providing restricted communication service to the authenticated/registered UE 1100.

The hybrid HeNB 2210 receives an attach request message including

IMSI as UE authentication information and IMEI as UE identity information from the authenticated/registered UE 1100. The local MME 2320 transfers a ME Identity Check Request message including IMSI and IMEI to the L-UEIR 2350 to determine whether to accept the attach request of the authenticated/registered UE 1100.

The L-UEIR 2350 receives the ME Identity Check Request message including IMSI and IMEI from the local MME 2320 at step S3310. Next, the L-UEIR 2350 determines whether the IMEI of the UE has been registered with the whitelist at step S3320. If the IMEI of the UE has not been registered with the whitelist, the L-UEIR 2350 generates an ME Identity Check Ack message for rejecting the attach request at step S3340 and transfers the ME Identity Check Ack message to the local MME 2320 at step S3350.

Otherwise, if the IMEI of the UE has been registered with the whitelist, the L-UEIR 2350 generates the ME Identity Check Request message for accepting the attach request of the UE at step S3330 and transfers the ME Identity Check Ack message to the local MME 2320 at step S3350.

Figure 34:
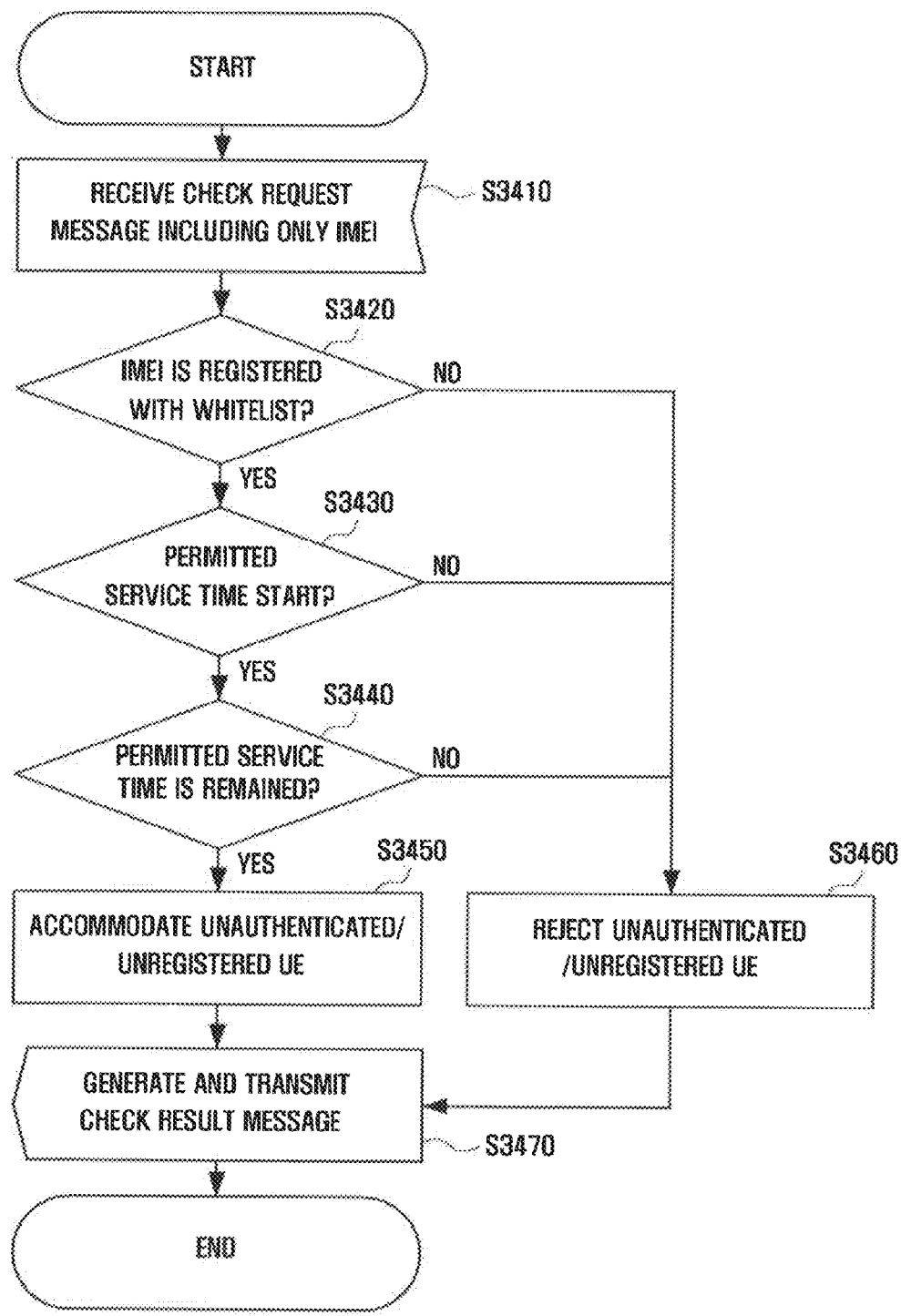
FIG. 34 is a flowchart illustrating an operating procedure of the L-UEIR 2350 of the hybrid HeNB 2210 when an attach request message is received from the unauthenticated/unregistered UE 1200.

FIG. 34 is a flowchart illustrating an operating procedure of the L-UEIR 2350 of the hybrid HeNB 2210 when an attach request message is received from the unauthenticated/unregistered UE 1200.

The attach request message received from the unauthenticated/unregistered UE 1200 includes only the UE identity information, i.e. IMEI. This is because the UE 1200 which had not performed authentication process has no authentication information, i.e. IMSI.

In this case, the L-UEIR 2350 receives the ME Identity Check Request message including IMEI from the local MME 2320 at step S3410. The L-UEIR 2350 determines whether the IMEI has been registered with the whitelist at step S3420. If the IMEI has not been registered, the L-UEIR 2350 generates the ME Identity Check Ack message for rejecting the attach request at step S3460.

Otherwise, if the IMEI has been registered, the L-UEIR 2350 determines whether the unauthenticated/unregistered UE service period has started at step S3430. If the unauthenticated/unregistered UE service period has not started, the L-UEIR 2350 generates the ME Identity Check Ack message for rejecting the attach request at step S3460.

Otherwise, if the unauthenticated/unregistered UE service period has started, the L-UEIR 2350 determines whether the unauthenticated/unregistered UE service period has expired at step S3440. If the unauthenticated/unregistered UE service period has expired, the L-UEIR 2350 generates the ME Identity Check Ack message for rejecting the attach request at step S3460.

Otherwise, if the unauthenticated/unregistered UE service period has not expired, the L-UEIR 2350 generates the ME Identity Check Ack message accepting the attach request at step S3450 and transfers the ME identity Check Ack message to the local MME 2320 at step S3470.

The ME Identity Check Ack message for the permitted unauthenticated/unregistered UE 1200 includes the information listed in FIG. 35 which is identical with that depicted in FIG. 19. Accordingly, detailed description thereon is omitted herein.

Figure 36:
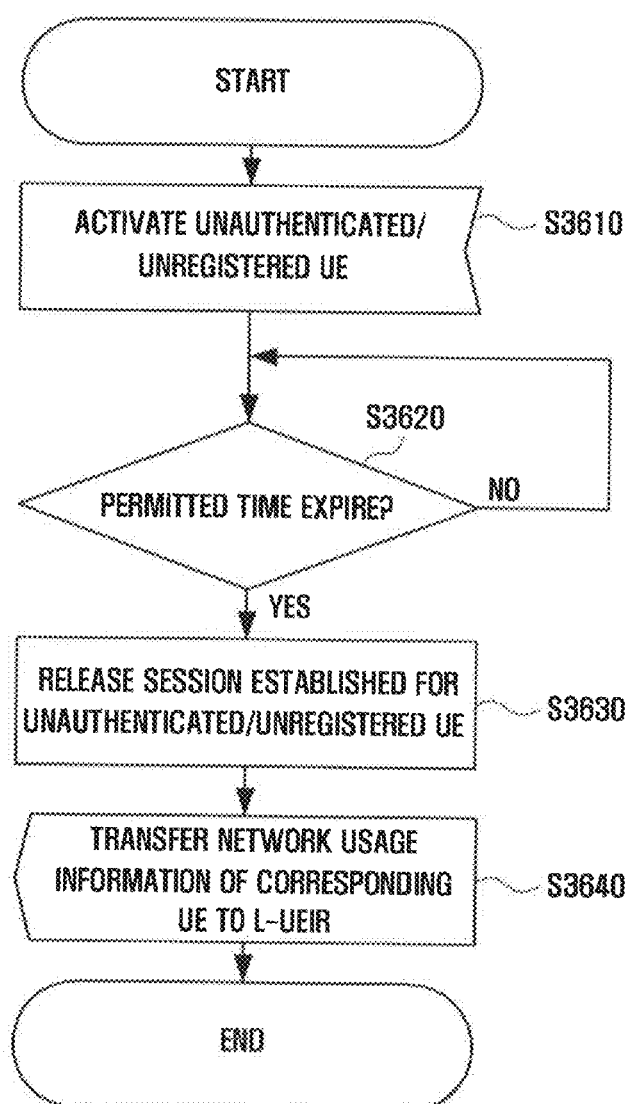
FIG. 36 is a flowchart illustrating an operating procedure for the local MME of the hybrid HeNB 2210 according to the second embodiment of the present invention to monitor communication service provided to the unauthenticated/unregistered UE 1200.

FIG. 36 is a flowchart illustrating an operating procedure for the local

MME of the hybrid HeNB 2210 according to the second embodiment of the present invention to monitor communication service provided to the unauthenticated/unregistered UE 1200.

The communication service provided to the unauthenticated/unregistered UE 1200 is blocked when the unauthenticated/unregistered UE service period has expired. The local MME 2320 starts the communication service to the unauthenticated/unregistered UE 1200 at step S3610.

The local MME 2320 determines whether the unauthenticated/unregistered UE service period has expired periodically at step S3620. If the unauthenticated/unregistered UE service period has expired, the local MME 2320 releases the session established for the unauthenticated/unregistered UE 1200 to end the communication service provision at step S3630. Next, the local MME 2320 transfers the network usage information of the unauthenticated/unregistered UE 1200 to the L-UEIR 2350 at step S3640.

Figure 37:
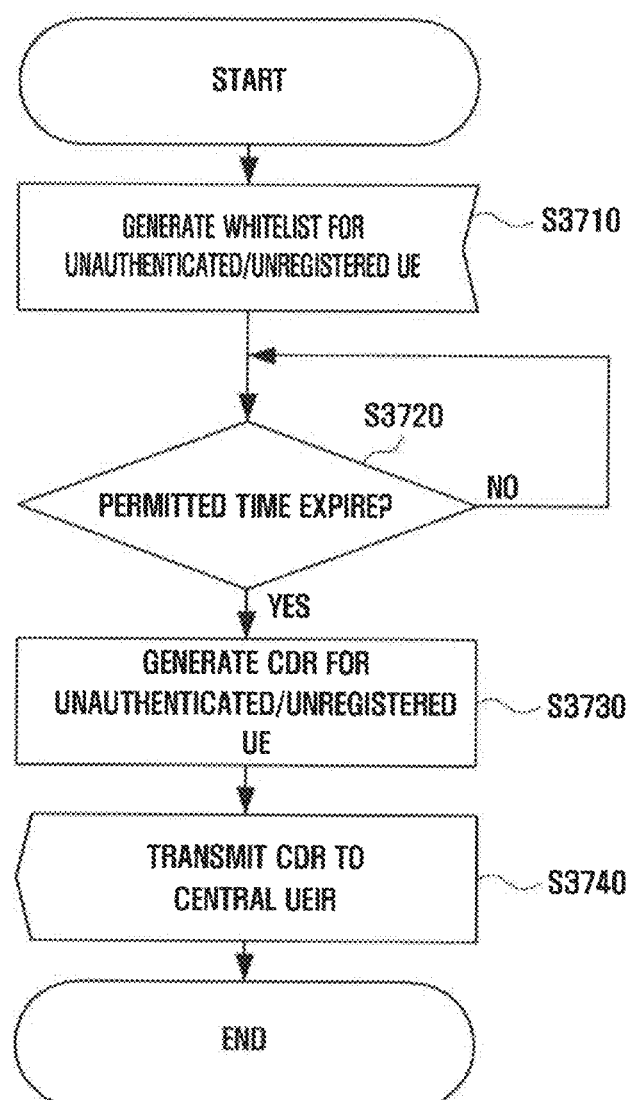
FIG. 37 is a flowchart illustrating operating procedure for the L-UEIR 2350 to monitor the communication service provided to the unauthenticated/unregistered UE 1200 according to an embodiment of the present invention.

FIG. 37 is a flowchart illustrating operating procedure for the L-UEIR 2350 to monitor the communication service provided to the unauthenticated/unregistered UE 1200 according to an embodiment of the present invention.

A whitelist for the unauthenticated/unregistered UE 1200 is generated through central UEIR and user control/management procedure at step S3710. The L-UEIR 2350 monitors periodically to determine whether the unauthenticated/unregistered UE service period has expired at step S3720. If the unauthenticated/unregistered UE service period has expired, the L-UEIR 2350 generates a Call Detail Report (CDR) for the unauthenticated/unregistered UE 1200 at step S3730. Next, the L-UEIR 2350 transfers the CDR to the central UEIR at step S3740.

Industrial Applicability

While the invention is described in terms of some specific examples and embodiments, it will be clear that this invention is not limited to these specific examples and embodiments and that many changes and modified embodiments will be obvious to those skilled in the art without departing from the true spirit and scope of the invention.

For example, although the description is directed to the case where the functional entities such as SGW, PGW, and MME of the core network are implemented in an HeNB, the present invention is not limited thereto but can be implemented by extending the functionalities of the conventional core network entities with the functions disclosed in the present invention.

What is claimed is:

1. A method for a small base station to provide a terminal with communication service in a wireless communication system, the method comprising:
   receiving, at a local mobility management entity, an attach request received from the terminal;
   transmitting, at the local mobility management entity, a service provision check request message asking for whether the terminal is registered with the communication service to a local registration processor; and
   providing the terminal with the communication service in response to a service provision check acknowledge message accepting the attach request which is received from the local registration processor and no communication service in response to the service provision check acknowledge message rejecting the attach request which is received from the local registration processor,
   wherein the local mobility management entity and the local registration processor are integrated in the small base station, and
   wherein the attach request message comprises, if the terminal is an unauthenticated or unregistered terminal, emergency attach option and identifier of the unauthenticated/unregistered terminal.

2. The method of claim 1, wherein the attach request message comprises, if the terminal is an authenticated or registered terminal, authentication information and identity information of the terminal.

3. The method of claim 1, wherein providing comprises providing, at the local mobility management entity, the unauthenticated or unregistered terminal with emergency service if the service provision check acknowledge message rejecting the attach request is received.

4. The method of claim 1, wherein providing comprises bypassing, at the local mobility management entity, the attach request message to a core network mobility management entity if the service provision check acknowledge message rejecting the attach request is received.

5. The method of claim 1, wherein the attach request message comprises an attach service option indicating at least one of un-authentication and un-registration and identifier of the terminal if the terminal is unauthenticated terminal or unregistered.

6. The method of claim 1, wherein the local registration processor determines, if the service provision check request message is received, whether to accept or reject service provision according to whether the terminal is registered with a whitelist for permitting service provision.

7. The method of claim 6, wherein the local registration processor permits, if a service provision period for the terminal registered with the whitelist has started and not expired, the service provision to the terminal.

8. The method of claim 1, wherein the service provision check acknowledge message accepting the attach request comprises at least one of an identifier of the terminal accepted for attachment, a service option permitted by the small base station, a service provision start time, and a service provision end time.

9. An apparatus for providing a terminal with communication service in a wireless communication system, comprising:
- a home base station processor configured to receive an attach request message transmitted by the terminal;
- a local mobility management entity configured to transmit a service provision check request message asking for whether the terminal is registered with the communication service to a local registration processor, to provide the terminal with the service in response to a reply accepting the attach request, and to reject service provision in response to a reply rejecting the attach request; and
- a local registration processor configured to generate and output, if the service provision check request message is received from the local mobility management entity, a service provision check acknowledge accepting or rejecting the attach request according to whether the service is to be provided to the terminal,
- wherein the local mobility management entity and the local registration processor are integrated in a small base station, and
- wherein the local mobility management entity judges, if the attach request message includes an emergency attach option and terminal identifier, the terminal as unauthenticated or unregistered terminal.

10. The apparatus of claim 9, wherein the local mobility management entity judges, if the attach request message includes at least one of authentication information and identity information of the terminal, the terminal as authenticated or registered terminal.

11. The apparatus of claim 9, wherein the local mobility management entity provides, if a replay rejecting the attach request from the local registration processor, the unauthenticated or unregistered terminal with emergency service.

12. The apparatus of claim 9, wherein the local mobility management entity bypasses, if a replay rejecting the attach request from the local registration processor, the attach request message to a core network mobility management entity.

13. The apparatus of claim 9, wherein the local mobility management entity judges, if the attach request message includes an attach service option indicating at least one of un-authentication and un-registration and identifier of the terminal, the terminal as unauthenticated or unregistered terminal.

14. The apparatus of claim 9, wherein the local registration processor accepts or rejects, if the service provision check request message is received, service provision depending on whether the terminal is registered with a whitelist for permitting service provision.

15. The apparatus of claim 14, wherein the local registration processor permits, if a service provision period for the terminal registered with the whitelist has started and not expired, the service provision to the terminal.

16. The apparatus of claim 9, wherein the service provision check acknowledge message accepting the attach request comprises at least one of an identifier of the terminal accepted for attachment, a service option permitted by the small base station, a service provision start time, and a service provision end time.

17. The apparatus of claim 9, wherein the local registration processor comprises an interface for communication with at least one of authentication server and registration server of the core network.

* * * * *